(12) United States Patent
Borac

(10) Patent No.: US 7,184,039 B2
(45) Date of Patent: Feb. 27, 2007

(54) COMPUTER-IMPLEMENTED METHOD FOR GENERATING COARSE LEVEL MESHES FOR MULTI-RESOLUTION SURFACE EDITING

(75) Inventor: Silviu Borac, Picton (CA)

(73) Assignee: Mental Images GmbH, Berlin (DE)

( * ) Notice: Subject to any disclaimer, the term of this patent is extended or adjusted under 35 U.S.C. 154(b) by 1227 days.

(21) Appl. No.: 09/852,906

(22) Filed: May 9, 2001

(65) Prior Publication Data
US 2005/0276518 A1 Dec. 15, 2005

Related U.S. Application Data

(60) Provisional application No. 60/203,158, filed on May 9, 2000.

(51) Int. Cl.
*G06T 17/00* (2006.01)
(52) U.S. Cl. ...................... 345/420; 345/428
(58) Field of Classification Search ............... 345/420, 345/428
See application file for complete search history.

(56) References Cited

U.S. PATENT DOCUMENTS

| | | | | |
|---|---|---|---|---|
| 5,506,947 A | * | 4/1996 | Taubin | 345/441 |
| 6,009,435 A | * | 12/1999 | Taubin et al. | 707/101 |
| 6,266,062 B1 | * | 7/2001 | Rivara | 345/419 |

FOREIGN PATENT DOCUMENTS

EP 0 784295 7/1997

OTHER PUBLICATIONS

Michael Loundsbery, Tony D. DeRose, and Joe Warren "Multiresolution Analysis for Surfaces of Arbitrary Topological Type," Jan. 1997, ACM Transactions on Graphics, vol. 16, No. 1, p. 34-73.*

(Continued)

*Primary Examiner*—Ulka Chauhan
*Assistant Examiner*—Jason M. Repko
(74) *Attorney, Agent, or Firm*—Jacobs & Kim LLP; David A. Jacobs

(57) ABSTRACT

An arrangement is disclosed for generating a coarse level mesh representing a surface, from a finer level mesh surface representation. The arrangement includes an indicator value generator and a coarse level mesh generator. The indicator value generator, for respective ones of the points in the finer level mesh surface representation, evaluates an indicator function, the value indicating whether a subdivision-inverse filter methodology or a least-squares optimization methodology is to be used to determine a position for the corresponding point in the coarse level mesh representation. The coarse level mesh generator determines, for each of the points that is to be provided in the coarse level mesh representation, a position in response to the position of the corresponding point in the finer level mesh representation, in accordance with the one of the subdivision-inverse filter methodology and least-squares optimization methodology indicated by the indicator value generated by the indicator value generator.

16 Claims, 15 Drawing Sheets

OTHER PUBLICATIONS

Denis Zorin, Peter Schröder, Wim Sweldens, "Interactive Multiresolution Mesh Editing," Aug. 1997, Proceedings of the 24th Annual Conference on Computer Graphics and Interactive Techniques, p. 259-268.*

W. J. Schroder et al., "Decimation Of Triangle Meshes" Computer Graphics, vol. 26, No. 2, pp. 65-70 (Jul. 1, 1992).

J. Popovic, et al, "Progressive Simplicial Complexes" Computer Graphics Proceedings, Siggraph 97, Los Angeles, CA, Aug. 3-8, 1997, pp. 217-224.

G. Taubin, "A Signal Processing Approach To Fair Surface Design" Computer Graphics Proceedings, Siggraph, Los Angeles, CA, Aug. 6, 1997, pp. 351-358.

M. Garland et al, "Simplifying surfaces with color and texture using quadric error metrics" Visualization 98. Proceedings Research Triangle Park, NC, U. S. A. Oct. 19-23, 1998.

M. Garland et al, "Surface simplification using quadric error metrics" Computer Graphics Proceedings, Siggraph 97, Proc. 24th Int'l Conf on Computer Graphics and Interactive Techniques, Los Angeles, CA, Aug. 3-8, 1997, pp. 209-216.

D. Zorin et al., "Interactive Multi-Resolution Mesh Editing" Computer Graphics Proceedings, Siggraph 97, Los Angeles, CA, Aug. 3-8, 1997, pp. 259-268.

* cited by examiner

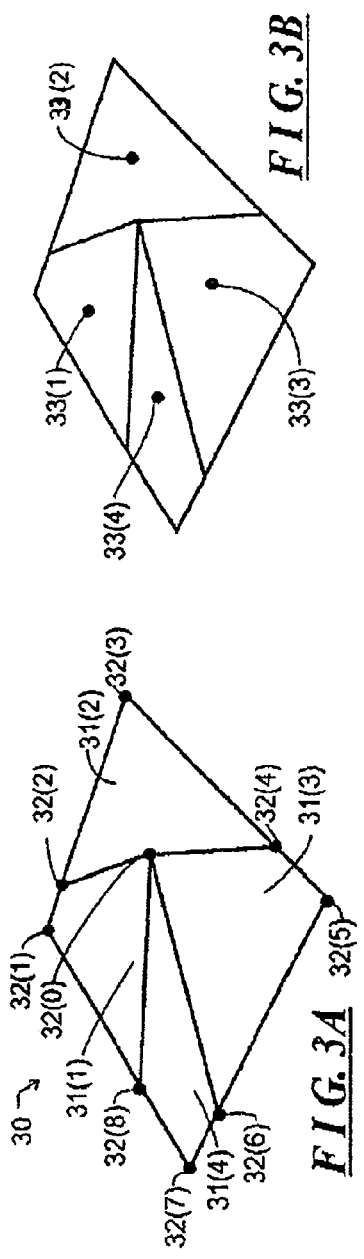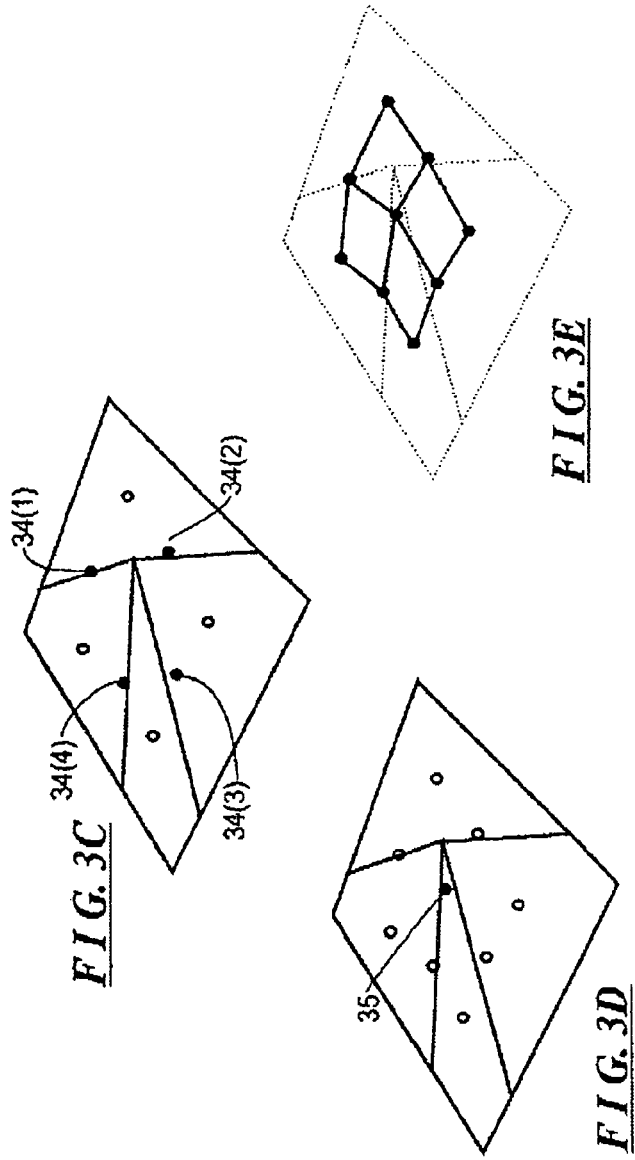

COMPUTER-IMPLEMENTED METHOD FOR GENERATING COARSE LEVEL MESHES FOR MULTI-RESOLUTION SURFACE EDITING

This application claims priority from U.S. Provisional Patent Application Serial No. 60/203,158 filed May 9, 2000.

FIELD OF THE INVENTION

The invention relates generally to the field of computer graphics, and more specifically to generation of meshes representing surfaces of objects. The invention specifically provides a computer graphics system and computer-implemented method for generating a coarse-level mesh from a fine-level mesh, which may be used in multi-resolution surface editing.

BACKGROUND OF THE INVENTION

Generally, in computer graphics, objects are represented as surfaces, with the surfaces being represented by meshes. A mesh consists of a set of vertices, or points in three-dimensional space, interconnected by edges. The edges define polygonal faces, which may be in the form of triangles, quadrilaterals, and so forth. In some computer graphic operations, it is desirable to generate a representation of a surface at a finer resolution than a current representation. There are several popular methodologies for generating a representation of a surface at a finer resolution than a current representation, including a Catmull-Clark surface subdivision methodology and a Loop surface subdivision methodology. In other operations, it can also be desirable to generate from a mesh representing a surface at one level of resolution, a mesh at a coarser resolution. A methodology for generating a representation of a surface at a coarser resolution than a current representation, and a methodology for generating such a surface representation, based on the Loop methodology, is described in D. Zorin, et al., "Interactive Multiresolution Mesh Editing, SIGGRAPH 1997, Computer Graphics Proceedings, pp. 259–268, particularly p. 262.

The methodology described in Zorin relies on a method for smoothing triangular meshes that is described in G. Taubin, "A signal processing approach to fair surface design," SIGGRAPH 1995, Computer Graphics Conference Proceedings, pp. 351–358. Taubin's smoothing methodology consists of two linear filtering steps, the first being a low-pass filter step, followed by a high-pass filter step. The high-pass filter step is used to cancel out a mesh-shrinking effect that is induced by the low-pass filter step. The filtering operations described by Taubin have the problem that, as a consequence of the linearity of the filtering procedure, artifacts referred to as Gibbs ripples are introduced in the smoothed mesh as a result of discontinuities in the input mesh. When used in generating a coarse level mesh, Taubin's filtering produces Gibbs ripples at the places on the surface where the fine level mesh has sharp variations. Although Taubin's smoothing methodology may be configured with the help of parameters, no filter can play the role of an inverse of the Loop subdivision rule. Accordingly, in a multi-resolution representation of a Loop subdivision surface, there will be redundant detail information.

SUMMARY OF THE INVENTION

The invention provides a new and improved system and method for generating a coarse-level mesh from a fine-level mesh, which may be used in multi-resolution surface editing.

In brief summary, the invention provides an arrangement for generating a coarse ("j") level mesh representing a surface, from a finer ("j+1") level mesh surface representation. The arrangement includes an indicator value generator and a coarse level mesh generator. The indicator value generator, for respective ones of the points in the finer level mesh surface representation, evaluates an indicator function, the value indicating whether a subdivision-inverse filter methodology or a least-squares optimization methodology is to be used to determine a position for the corresponding point in the coarse level mesh representation. The coarse level mesh generator determines, for each of the points that is to be provided in the coarse level mesh representation, a position in response to the position of the corresponding point in the finer level mesh representation, in accordance with the one of the subdivision-inverse filter methodology or least-squares optimization methodology indicated by the indicator value generated by the indicator value generator.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 3, 3A through 3E depict a mesh representing a surface to which the Catmull-Clark surface subdivision methodology has been applied;

DETAILED DESCRIPTION OF AN ILLUSTRATIVE EMBODIMENT

Figure 1:
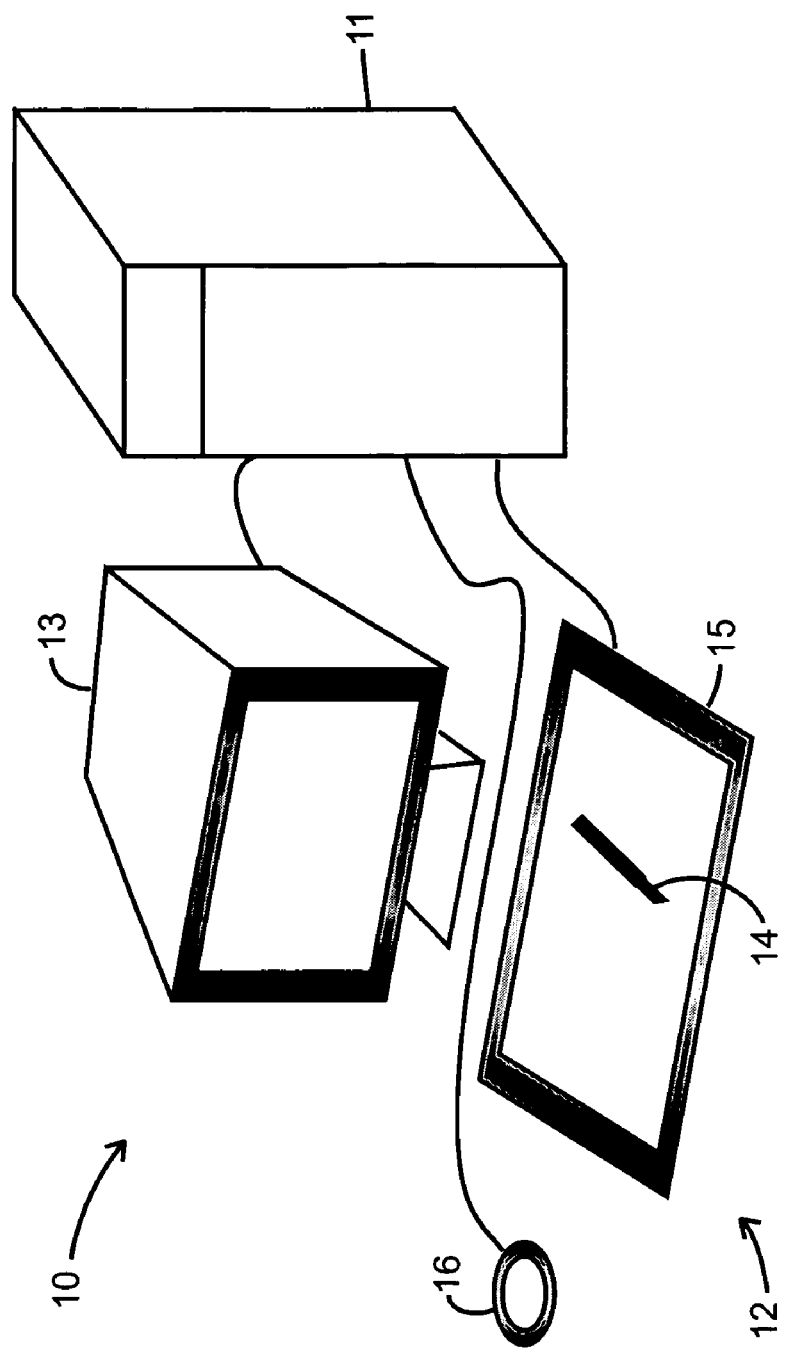
FIG. 1 depicts a computer graphics system including an arrangement for generating a coarse level mesh representation of a surface from a finer level mesh of a surface, constructed in accordance with the invention.

FIG. 1 depicts a computer graphics system 10 including an arrangement for generating a coarse level mesh representation of a surface from a finer level mesh of a surface, constructed in accordance with the invention. With reference to FIG. 1, the computer graphics system includes a processor module 11, one or more operator input devices 12 and one or more display devices 13. The display device(s) 13 will typically comprise a frame buffer, video display terminal or the like, which will display information in textual and/or graphical form on a display screen to the operator. The operator input devices 12 for a computer graphics system 10 will typically include a pen 14 which is typically used in conjunction with a digitizing tablet 15, and a trackball or mouse device 16. Generally, the pen 14 and digitizing tablet will be used by the operator in several modes. In one mode, the pen 14 and digitizing tablet are used to provide updated shading information to the computer graphics system. In other modes, the pen and digitizing tablet are used by the operator to input conventional computer graphics information, such as line drawing for, for example, surface trimming and other information, to the computer graphics system 10, thereby to enable the system 10 to perform conventional computer graphics operations. The trackball or mouse device 16 can be used to move a cursor or pointer over the screen to particular points in the image at which the operator can provide input with the pen and digitizing tablet. The computer graphics system 10 may also include a keyboard (not shown) which the operator can use to provide textual input to the system 10.

The processor module 11 generally includes a processor, which may be in the form of one or more microprocessors, a main memory, and will generally include one a mass storage subsystem including one or more disk storage devices. The memory and disk storage devices will generally store data and programs (collectively, "information") to be processed by the processor, and will store processed data which has been generated by the processor. The term "memory and disk storage devices" can encompass any computer readable medium, such as a computer hard disk, computer floppy disk, computer readable flash drive, computer-readable RAM or ROM element or equivalent means of encoding digital information on a physical medium. The term "programs" can encompass any computer program product consisting of computer-readable program instructions encoded on a computer readable medium. The processor module includes connections to the operator input device(s) 12 and the display device(s) 13, and will receive information input by the operator through the operator input device(s) 12, process the input information, store the processed information in the memory and/or mass storage subsystem. In addition, the processor module can provide video display information, which can form part of the information obtained from the memory and disk storage device as well as processed data generated thereby, to the display device(s) for display to the operator. The processor module 11 may also include connections (not shown) to hardcopy output devices such as printers for facilitating the generation of hardcopy output, modems and/or network interfaces (also not shown) for connecting the system 10 to the public telephony system and/or in a computer network for facilitating the transfer of information, and the like.

The invention provides an arrangement for generating a coarse-level mesh from a finer level mesh. In the following, the fine level mesh will continue to be identified by index "j+1," and the coarse level mesh will continued to be identified by index "j." Before describing the operations performed by the fine-to-coarse mesh generating arrangement in connection with generating a coarse level mesh from a current representation, it would be helpful to describe two surface subdivision methodologies, namely the aforementioned Loop surface subdivision methodology and a Catmull-Clark surface subdivision methodology, which are used to generate a finer ("j+1) level mesh from a coarse ("j") level mesh. The invention provides an arrangement for essentially performing, in the case of a triangular mesh, operations that generally provide the inverse of Loop's surface subdivision methodology, and, in the case of a quadrilateral mesh, operations that generally provide the inverse of the Catmull-Clark surface subdivision methodology.

Figure 2:
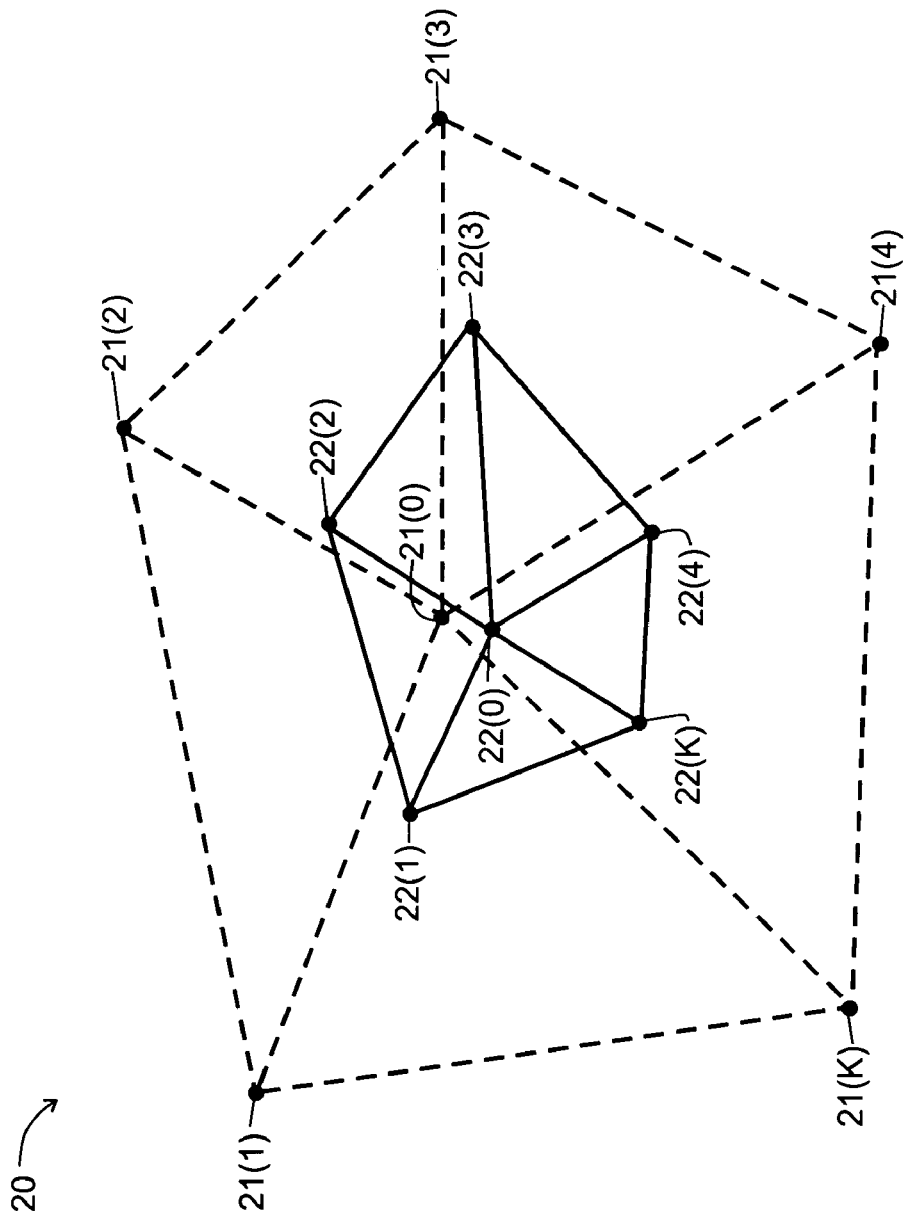
FIG. 2 depicts a mesh representing a surface to which the Loop surface subdivision methodology has been applied.

Loop's surface subdivision methodology will be described in connection with FIG. 2. Generally, in Loop's surface subdivision methodology, each triangular face in the original mesh is split into a plurality of subface, the subfaces defining the finer level mesh. The vertices of the finer level mesh are positioned using weighted averages of the positions of the vertices in the original mesh. More specifically, and with reference to FIG. 2, a mesh 20 at a fine "j" level is depicted that includes a vertex $v_q$ 21(0) located at position $c^j(q)$, and a plurality "K" of surrounding points $v_q(1)$ through $v_q(K)$ (generally, $v_q(k)$) 21(1) through 21(K) (generally identified by reference numeral 21(k)) located at positions at respective positions $c^j(1)$ through $c^j(K)$, the points $v_q(k)$ 21(k) being those points in the mesh 20 that are connected to vertex $v_q$ by edges. ("K," the number of points connected to vertex $v_q$ will sometimes be referred to as the vertex's "valence.") Denoting the set of the indices of the points $v_q(k)$ in the mesh that are connected to vertex $v_q$ by $N(q,j)$, a mesh at the next higher fineness level "j+1" corresponds to vertex $v'_q$ 22(0) located at position $c^{j+1}(q)$ and a set of surrounding points $v'_q(1)$ 22(1) at located at positions $c^{j+1}(l)$ and connected to the vertex $v'_q$ 22(0). The finer level mesh is constructed by providing the vertex $v'_q$ 22(0) at a position $c^{j+1}(q)$ that is determined by $$c^{j+1}(q) = (1 - a(K))\, c^j(q) + \frac{a(K)}{K} \sum_{k \in N(q,j)} c^j(k) \quad (1)$$

and points $v'_q(1)$ 22(1) at positions $c^{j+1}(l)$ that are determined by $$c^{j+1}(l) = \frac{3}{8}[c^j(q) + c^j(k)] + \frac{1}{8}[c^j(k-1) + c^j(k+1)], \quad (2)$$

$$k = 1, \ldots, K,$$

where the weighting factor $a(K)$ is given by $$a(K) = \frac{5}{8} - \left(\frac{3 + 2\cos\left(\frac{2\pi}{K}\right)}{8}\right)^2. \quad (3)$$

Equations (1) and (2) are applied by selecting each point in the mesh at level "j" as a vertex, to provide points for the mesh at level "j+1." Loop's surface subdivision methodology can be applied recursively to provide a mesh at any desired degree of fineness. It will be appreciated that equation (2) will provide that the point $v'_q(1)$ 22(1) that is created when the methodology is applied to point $v_q$ 21(0) as the vertex will be in the same position when the methodology is applied to point $v_q(k)$ 21(k) as the vertex.

It will be appreciated that, the Loop surface subdivision methodology provides (i) one new point, at location $c^{j+1}(1)$ in the finer ("j+1") level mesh, for, and generally somewhere between, each pair of points in the coarse ("j") level mesh, and (ii) a relocated point, at location $c^{j+1}(q)$ in the finer ("j+1") level mesh for, and generally somewhat near, each point in the coarse ("j") level mesh, which are interconnected to form the finer ("j+1) level mesh. Accordingly, in performing the inverse, that is, processing a finer ("j+1") level mesh to generate a coarse ("j") level mesh, the arrangement processes the points in the finer ("j+1") level mesh to remove, for each pair of connected points in the finer ("j+1") level mesh, and determines a position for the remaining point, which will be present in the coarse ("j") level mesh, based on the positions of surrounding points in the finer ("j+1") level mesh. The operations performed by the arrangement in determining the position of the point that is to remain in the coarse ("j") level mesh will be described below.

The Catmull-Clark subdivision methodology produces smooth surfaces using a small number of neighboring vertices. The Catmull-Clark surface subdivision methodology will be described in connection with FIGS. 3A through 3E. With reference to FIG. 3A, that FIG. depicts a mesh 30 consisting of four quadrilaterals 31(1) through 31(4). Each quadrilateral is referred to as a face. The quadrilaterals are defined by points 32(0), which is common to all of the quadrilaterals 31(1) through 31(4), and other points 32(1) through 32(8). Generally, the Catmull-Clark surface subdivision methodology is performed in a series of iterations, including (i) a face point generation iteration, in which, for each face, a face point 33(1) through 33(4) is generated as the average of the points 32(p) defining the respective face (reference FIG. 3B);

(ii) an edge point generation iteration in which, for each edge, a new edge point 34(1) through 34(4) is generated as the average of the midpoint of the original edge with the two new face points of the faces adjacent to the edge (reference FIG. 3C; the face points generated during the face point generation iteration are shown as circles);

(iii) a vertex point iteration in which a vertex point 35 is generated in relation to the positions of the new face points generated in iteration (i) for faces that are adjacent to the original vertex point, the positions of the midpoints of the original edges that are incident on the original vertex point, the position of the original vertex point, and the valence of the original vertex point (reference FIG. 3D; the face and edge points generated during the face point and edge point generation iterations are shown as circles); and (iv) a mesh connection step (reference FIG. 3E) in which:

(a) each new face point is connected to the edge points of the edges defining the original face; and (b) each new vertex point is connected to the new edge points of all original edges incident on the original vertex point.

More specifically, in the Catmull-Clark subdivision methodology, denoting, for a vertex $v_q$ at location $c^j(q)$, (i) the set of indices of neighboring points $c^j(l)$ that are connected thereto (for example, for point 32(0), point 32(2) and 32(8)) by $N_e(q,j)$, and (ii) the set of indices of second-order neighboring points that are opposite to vertex $c^j(q)$ with respect to the level "j" faces (for example, for point 32(0), point 32(1)) that are incident with vertex $c^j(q)$ by $N_f(q,j)$ a mesh at the next higher fineness level "j+1" is constructed as follows. In the face point generation iteration, the face points are generated and located at positions $c^{j+1}(m_i)$ determined as follows $$c^{j+1}(m_i) = \frac{1}{4}(c^j(q) + c^j(l_i) + c^j(l_{i+1}) + c^j(r_i)), \quad (4)$$

$$m_i \in N_f(q, j+1), l_i, l_{i+1} \in N_e(q, j), r_i \in N_f(q, j).$$

In the edge point generation iteration, the edge points are generated and located at positions $c^{j+1}(l_i)$ determined as follows:

$$c^{j+1}(l_i) = \frac{1}{4}(c^j(q) + c^j(k_i) + c^{j+1}(m_{i-1}) + c^{j+1}(m_i)), \quad (5)$$

$$l_i \in N_e(q, j+1), k_i \in N_e(q, j), m_{i-1}, m_i \in N_f(q, j+1)$$

In the vertex point generation iteration, the new vertex points are generated and located at positions as follows:

$$c^{j+1}(q) = \frac{K-2}{K} c^j(q) + \frac{1}{K^2} \sum_{i=0}^{K-1} c^j(l_i) + \frac{1}{K^2} \sum_{i=0}^{K-1} c^{j+1}(m_i) \quad (6)$$

$$l_i \in N_e(j+1, q), m_i \in N_f(j+1, q).$$

In terms of only points $c^j$, that is substituting for the last term in equation (6), $$c^{j+1}(q) = \left(1 - \frac{7}{4K}\right) c^j(q) + \frac{3}{2} \frac{1}{K^2} \sum_{l \in N_e(q,j)} c^j(l) + \frac{1}{4K^2} \sum_{m \in N_f(q,j)} c^j(m). \quad (7)$$

Generally, for quadrilateral meshes, the arrangement makes use of the Catmull-Clark methodology, except for the case of K=3 in equation (6). In that case, the arrangement makes use of $$c^{j+1}(q) = (1 - 8\gamma) c^j(q) + 4\gamma \frac{1}{K} \sum_{l \in N_e(q,j)} c^j(l) + 4\gamma \frac{1}{K} \sum_{m \in N_f(q,j+1)} c^{j+1}(m), \quad (8)$$

where $$\gamma = \frac{3}{38}.$$

Equation (8) would correspond to the Catmull-Clark methodology (equation (6)) with $$\gamma = \frac{1}{4K},$$

except that, for K=3, $$\gamma = \frac{3}{38}$$

instead of 1/12. In terms of only points $c^j$ (compare equation (7))

$$c^{j+1}(q) = (1 - 7\gamma) c^j(q) + 6\gamma \frac{1}{K} \sum_{l \in N_e(q,j)} c^j(l) + \gamma \frac{1}{K} \sum_{m \in N_f(q,j)} c^j(m). \quad (9)$$

As is apparent from the above discussion, the Catmull-Clark surface subdivision methodology applied to a quadrilateral mesh at the coarse ("j") level will produce a quadrilateral mesh at the finer ("j+1") level having the same number of points as the mesh at the coarse ("j") level, but the points in the finer ("j+1") level may be at different positions than in the coarse ("j") level. Accordingly, in performing the inverse, that is, processing a finer ("j+1") level mesh to generate a coarse ("j") level mesh, the arrangement processes the points in the finer ("j+1") level mesh determine a position for each point in the finer ("j+1") level mesh based on the positions of surrounding points in the finer ("j+1") level mesh. The operations performed by the arrangement in determining the position of the point in the coarse ("j") level mesh will be described below.

As noted above, the invention provides an arrangement for generating a coarse ("j) level mesh from a finer ("j+1") level mesh. In generating a coarse mesh from a fine mesh, an indicator function is used locally in connection with each point that is being processed as a vertex to determine whether, around the respective point, the fine mesh can be derived by subdivision of a coarser mesh using a subdivision inverse filter. If so, the value of the indicator function, which will be described below, will be "zero" or close to "zero." On the other hand, if the fine mesh cannot be derived by subdivision of a coarser mesh in the region around the respective vertex using a subdivision inverse filter, the value of the indicator function will not be close to "zero," and in that case the coarse mesh will be generated using an approximate solution of a least-squares problem.

The indicator function is constructed for each point, selected as a vertex $v'_q$, using the value of the Laplacian $L(k,j+1)$ of the positions of the point and of the other points in its neighborhood in the finer (j+1) level mesh. For triangular meshes, in the one-dimensional case, for example, for a vertex $v'_q$ on a boundary, crease line or the like in the finer ("j+1") level mesh, the Laplacian for the vertex is $$L(k, j+1) = \frac{1}{2}[c^{j+1}(k-1) + c^{j+1}(k+1)] - c^{j+1}(k), \quad (10)$$

where $c^{j+1}(k)$ is the position of the vertex $v'_q$ in the finer ("j+1) level mesh for which the Laplacian is being generated, and $c^{j+1}(k-1)$ and $c^{j+1}(k+1)$ are the positions of the neighboring points $v'_q(k-1)$ and $v'_q(k+1)$ in the fine (j+1) level mesh. In the two-dimensional case, that is, in the case of a vertex $v'_q$ other than on a boundary, crease line or the like, for a regular vertex, that is, for a vertex for which the valence "K" is equal to "six," the Laplacian is $$L(k, j+1) = \frac{1}{6}\left(\sum_{l \in N(k,j+1)} c^{j+1}(l)\right) - c^{j+1}(k), \quad (11)$$

where the factor "⅙" reflects the valence of the vertex. Also in the two-dimensional case, for an irregular vertex, that is, for a vertex for which the valence "K" is not equal to "six," which may be the case at, for example, edges of the mesh, the Laplacian is $$L(k, j+1) = \rho\left[\frac{1}{K}\sum_{l \in N(k,j+1)} c^{j+1}(l) - c^{j+1}(k)\right], \quad (12)$$

where $$\rho = -\frac{3 + 8a(K)}{3(-5 + 8a(K))}, \quad (13)$$

where a(K) is defined in equation (3) above.

For quadrilateral meshes, in the one-dimensional case, that is, for a vertex $v'_q$ on a boundary, crease line, or the like in the finer ("j+1") level mesh, the Laplacian $L(k,j+1)$ for the vertex $v'_q$ is $$L(k, j+1) = \frac{1}{2}(c^{j+1}(k-1) + c^{j+1}(k+1)) - c^{j+1}(k) \quad (14)$$

where $c^{j+1}(k)$ is the position of the vertex $v'_q$ for which the Laplacian is being generated in the finer ("j+1") level mesh, and $c^{j+1}(k-1)$ and $c^{j+1}(k+1)$ are the positions of the neighboring points in the finer (j+1) level mesh. In the two-dimensional case, that is, in the case of a vertex $v'_q$ other than on a boundary, crease line or the like, two Laplacians are used, namely a Laplacian $L_e(k,j+1)$ using the position $c^{j+1}(k)$ of the vertex $v'_q$ and the positions of the points whose indices are in the set $N_e(q,j)$, and a Laplacian $L_f(k,j+1)$ using the position $c^{j+1}(k)$ and the positions of the vertices whose indices are in the set $N_f(q,j)$, as follows $$L_e(k, j+1) = \frac{1}{K}\left(\sum_{l \in N_e(k,j+1)} c^{j+1}(l)\right) - c^{j+1}(k) \quad (15)$$

and $$L_f(k, j+1) = \frac{1}{K}\left(\sum_{l \in N_f(k,j+1)} c^{j+1}(l)\right) - c^{j+1}(k). \quad (16)$$

As will be described below, the arrangement makes use of values of both Laplacians $L_e(k,j+1)$ and $L_f(k,j+1)$, and so both values will be generated for each vertex.

Figure 4:
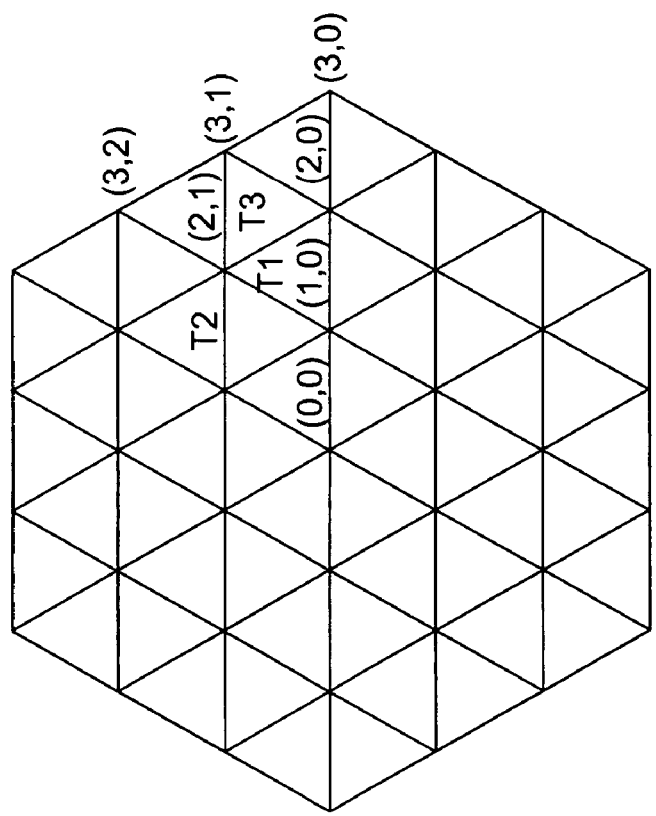

As noted above, the arrangement makes use of an indicator function. For triangular meshes, the indicator function i(q) for a point as vertex $v'_q$ is given by, in the one-dimensional case $$i(q) = L(q) - (L(q-1) + L(q+1)) + \frac{1}{2}(L(q-2) + L(q+2)) \quad (17)$$

and, for the two-dimensional case $$i(q) = -6L(q) + 2\sum_{l \in N(1,0)(q)} L(l) - 2\sum_{l \in N(2,0)(q)} L(l) + \sum_{l \in N(2,1)(q)} L(l), \quad (18)$$

where the indices for the sums in equation (18) are in the neighborhood of the vertex for which the indicator function is being evaluated are as depicted in FIG. 4.

In generating the values of the indicator function for quadrilateral meshes, the arrangement makes use of a linear combination $L_{ind}(k,j+1)$ of the Laplacians $L_e(k,j+1)$ and $L_f(k,j+1)$ described above (equations (15) and (16), respectively), namely $$L_{ind}(k, j+1) = 2\frac{K-5}{K-3}L_e(k, j+1) + \frac{1}{K-3}L_f(k, j+1) \quad (19)$$

for vertices for which valence "K" is not equal to "three." For vertices for which the valence "K" does equal "three," $L_{ind}(k,j+1)$ takes the form $$L_{ind}(k, j+1) = -\frac{22}{3}L_e(k, j+1) + 2L_f(k, j+1). \quad (20)$$

For regular vertices, that is, for vertices for which the valence "K" equals "four," equation (19) becomes $$L_{ind}^{reg} = -2L_e(k, j+1) + L_f(k, j+1). \quad (21)$$

Figure 5:
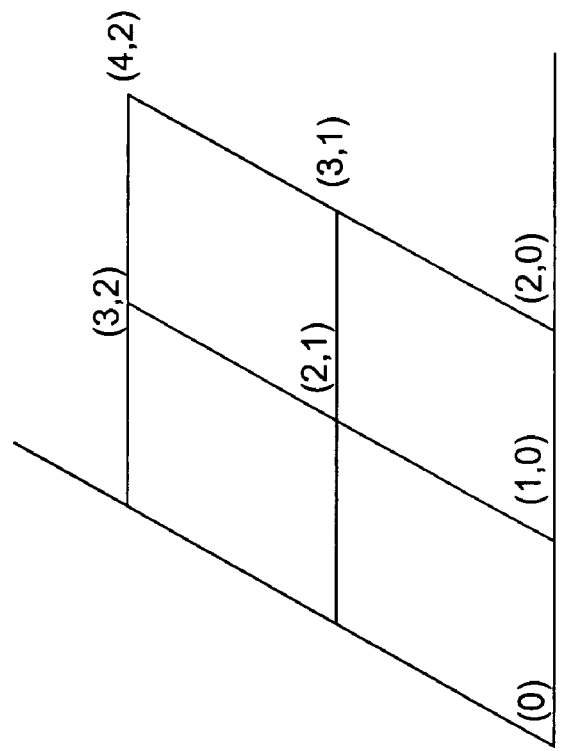
FIGS. 4 and 5 depict diagrams useful in understanding operations performed by the fine-to-coarse level mesh generating arrangement.

With this background, the indicator function i(k) for quadrilateral meshes is given by (omitting the index "j+1," since the indicator function will always be evaluated for vertices in the fine (j+1) level mesh)

$$i(k) = \qquad (22)$$
$$\frac{K}{4}L_{ind}(k) - \sum_{l \in N(1,0)(k)} L_{ind}(l) + \frac{1}{2}\sum_{l \in N(2,0)(k)} L_{ind}(l) + \sum_{l \in N(2,1)(k)} L_{ind}(l) -$$
$$\frac{1}{2}\sum_{l \in N(3,1)(k)} L_{ind}(l) - \frac{1}{2}\sum_{l \in N(3,2)(k)} L_{ind}(l) + \frac{1}{4}\sum_{l \in N(4,2)(k)} L_{ind}(l),$$

where the vertex neighborhoods for the respective sums are as shown in FIG. 5.

As noted above, the fine-to-coarse mesh generating arrangement generates a coarse ("j") level mesh from a finer ("j+1") level mesh. For a triangular mesh, the fine-to-coarse mesh generating arrangement determines, for each vertex $v'_q$ located at position $c^{j+1}(k)$ in the finer ("j+1") level mesh for which a vertex $v_q$ is to appear in the coarse ("j") level mesh, a position $c^j(k)$ for the vertex $v_q$ in accordance with $$c^j(k) = c^{j+1}(k) + \lambda L(k, j+1) \quad (23),$$

where $\lambda$ is a parameter whose value are determined as described below and $L(k,j+1)$ is the value of the Laplacian generated for the vertex $v'_q$ in the finer (j+1) level mesh. As noted above, not all of the vertices in the finer ("j+1") level mesh will have corresponding vertices in the coarse ("j") level mesh. If the value of the Laplacian $L(k,j+1)$ generated for a vertex $v'_q$ in the finer ("j+1") level mesh is relatively small, that is, if $$|L(k,j+1)| < \epsilon \quad (24)$$

for a selected small $\epsilon$, then for equation (23), the position $c^j(k)$ of the corresponding vertex $v_q$ in the coarse ("j") level mesh can be taken as the position $c^{j+1}(k)$ of the vertex $v'_q$.

In that case, neither the parameter $\lambda$, nor the indicator function i(q) (equations (17) and (18)), need to be generated.

If the value of the Laplacian $L(k,j+1)$ is not small, that is, if the condition in equation (24) does not hold, the manner in which parameter $\lambda$ for use in equation (23) is to be determined will depend on the value of the indicator function, generated as described above in connection with equations (17) and (18) and whether the vertex is on a boundary, crease line or the like, a regular vertex (that is, a vertex $v'_q$ whose valence "K" is "six") or an irregular vertex (that is, a vertex $v'_q$ whose valence "K" is other than "six"). If the value of the indicator function is zero, or close to zero, for the vertex $v'_q$, a subdivision-inverse filter is used in which (i) if the vertex is on a boundary, crease line or the like $$\lambda = -1 \quad (25),$$

(ii) if the vertex $v'_q$ is regular, that is, if its valence "K" is equal to "six," and is not on a boundary, crease line or the like $$\lambda = -\frac{3}{2}, \quad (26)$$

and (iii) if the vertex $v'_q$ is irregular, that is, if its valence "K" is not equal to "six," and is not on a boundary, crease line or the like $$\lambda = \frac{8a(K)}{-5 + 8a(K)}, \quad (27)$$

where a(K) is as defined above in connection with equation (3).

On the other hand, if the value of the indicator function i(q) is not zero or close to zero, a least-squares optimization is used in which (i) if the vertex is on a boundary, crease line or the like $$\lambda = \frac{1}{L(k)}\left[b_0^{1D}L(k) + \frac{1}{2}b_1^{1D}(L(k-1) + L(k+1))\right], \text{ where} \quad (28)$$
$$b_0^{1D} = -\frac{12}{35} \text{ and } b_1^{1D} = -\frac{23}{49}.$$

(ii) if the vertex $v'_q$ is regular, that is, if its valence "K" is equal to "six," and the vertex is not on a boundary, crease line or the like $$\lambda = \frac{1}{L(k)}\left[b_0^{reg}L(k) + \frac{1}{6}b_1^{reg}\sum_{l \in N(k,j+1)} L(l)\right], \quad (29)$$

where $$b_0^{reg} = -\frac{61}{5720} \text{ and } b_1^{reg} = -\frac{14403}{5720};$$

it will be appreciated that the factor "⅙" in equation (29) reflects the value of the valence "K," namely, "six."

(iii) if the vertex $v'_q$ is irregular, that is, if its valence "K" is not equal to "six," and the vertex is not on the boundary, crease line or the like $$\lambda = \frac{1}{L(k)}\left[b_0^{irreg}L(k) + \frac{1}{K}b_1^{irreg}\sum_{l\in N(k,j+1)}L(l)\right], \quad (30)$$

where $$b_0^{irreg} = \frac{2(5-8a(K))(14647K - 391848(K) + 391848a(k)^2)}{715(3+8a(k))(256+41K-512a(k)+256a(k)^2)} \quad (31)$$

and $$b_1^{irreg} = \frac{16(-5531K - 24521a(K) + 24521a(K)^2)}{715(256+41K-512a(K)+25a(K)^2)}, \quad (32)$$

where, for both equations (31) and (32), "K" corresponds to the valence of the irregular vertex, and a(K) is as defined in equation (3).

For a quadrilateral mesh, for each vertex $v'_q$ located at position $c^{j+1}(k)$ in the finer (+1) level mesh, a vertex $v_q$ is provided in the coarser (j) level mesh at a position $c^j(k)$ that is determined by $$c^j(k) = c^{j+1}(k) + \lambda_1 L_e(k,j+1) + \lambda_2 L_f(k,j+1) \quad (33),$$

where $\lambda_1$ and $\lambda_2$ are parameters whose values are determined as described below, and $L_e(k,j+1)$ and $L_f(k,j+1)$ are determined as described above in connection with equations (14) through (16). In the one-dimensional case, that is, for vertices on a boundary, crease line or the like, since only Laplacian $L_e$ is used, only one parameter $\lambda_1$ need be generated for use in equation (33). On the other hand for vertices that are not on a boundary, crease line, or the like, since both Laplacians $L_e$ and $L_f$ are used, both parameters $\lambda_1$ and $\lambda_2$ are generated for use in equation (33). As with the triangular mesh, if the values of $L_e(k,j+1)$ and $L_f(k,j+1)$ are relatively small, that is, if for a vertex $v'_q$ in the fine ("j+1") level mesh $$\max(|L_e(k,j+1)|, |L_f(k,j+1)|) < \epsilon \quad (34)$$

for a selected small $\epsilon$, then for equation (34), the position $c^j(k)$ of vertex $v_q$ in the coarse ("j") level mesh can be taken as the position $c^{j+1}(k)$ of vertex $v'_q$. In that case, neither the parameters $\lambda_1$ and $\lambda_2$, nor the indicator function $i(k,j+1)$ (equation (22)), need be generated.

If the condition in equation (34) does not hold, the values of parameter $\lambda_1$ and $\lambda_2$ for use in equation (33) will depend on the value of the indicator function. For a vertex $v'_q$ that falls on a boundary, crease line or the like, the value of the parameter $\lambda_1$ will be generated in the same manner as in a triangular mesh (reference equations (25) and (28) above). On the other hand, for a vertex $v'_q$ that does not fall on a boundary, crease line or the like, if the value of the indicator function $i(k,j+1)$ generated therefor is near zero, that is, if $$|i(k,j+1)| \leq \epsilon \cdot \max(|L_e(k,j+1)|, |L_f(k,j+1)|) \quad (35)$$

a subdivision-inverse filter is used in which, if the valence "K" of the vertex not equal to "three,"

$$\lambda_1 = -\frac{4}{K-3} \quad (36)$$

$$\lambda_2 = \frac{1}{K-3},$$

and, if the valence "K" for the vertex is equal to "three,"

$$\lambda_1 = -8, \lambda_2 = 2 \quad (37).$$

On the other hand, if, for a vertex $v'_q$, the value of the indicator function $i(k,j+1)$ is not near zero, that is, if the condition in inequality (35) is not satisfied, $$\lambda_1 = \frac{1}{L_e(k,j+1)}\left[b_{10}^{cc}L_e(k,j+1) + \frac{1}{K}b_{11}^{cc}\sum_{l\in N(k,j+1)}L_e(l,j+1)\right], \quad (38)$$

and $$\lambda_2 = \frac{1}{L_f(k,j+1)}\left[b_{20}^{cc}L_f(k,j+1) + \frac{1}{K}b_{21}^{cc}\sum_{l\in N_f(k,j+1)}L_f(l,j+1)\right], \quad (39)$$

which reflect a least squares optimization. If vertex $v'_q$ is regular, that is, if the vertex's valence "K" is "four,"

$$b_{10}^{cc} = -\frac{9946871}{4862025} \quad (40)$$

$$b_{11}^{cc} = -\frac{1024}{405}$$

$$b_{20}^{cc} = \frac{1644032}{972405}$$

$$b_{21}^{cc} = -\frac{1338874}{972405}.$$

On the other hand, if the vertex $v'_q$ is irregular, that is, if the vertex's valence "K" is other than "four,"

$$b_{10}^{cc} = \frac{162307143936 - 92746939392K - 8924282387K^3}{4862025(12544 - 14336K + 4096K^2 + 901K^3)} \quad (41)$$

$$b_{11}^{cc} = \frac{1024(2793728 - 1596416K - 244001K^3)}{99225(12544 - 14336K + 4096K^2 + 901K^3)}$$

$$b_{20}^{cc} = \frac{512(-113305472 + 64745984K + 17391149K^3)}{4862025(12544 - 14336K + 4096K^2 + 901K^3)}$$

$$b_{21}^{cc} = \frac{4(8660934688 - 4949105536K - 1876158821K^3)}{4862025(12544 - 14336K + 4096K^2 + 901K^3)}.$$

The following are approximations for equations (40) that are used in one embodiment of the arrangement:

$$b_{10}^{cc} = -2.04583$$

$$b_{11}^{cc} = -2.5284$$

$$b_{20}^{cc} = 1.69069$$

$$b_{21}^{cc} = -1.37687 \quad (42),$$

and the following are approximations for equations (41) that are used in the same embodiment:

$$b_{10}^{cc} = \frac{1623.07 - 927.469K - 89.2428K^3}{609.892 - 697.02K + 199.149K^2 + 43.8068K^3} \quad (43)$$

$$b_{11}^{cc} = \frac{28.6078 - 16.3473K - 2.49857K^3}{12.4468 - 14.2249K + 4.06426K^2 + 0.894017K^3}$$

$$b_{20}^{cc} = \frac{-580.124 + 331.499K + 89.0427K^3}{609.892 - 697.02K + 199.149K^2 + 43.8068K^3}$$

$$b_{21}^{cc} = \frac{346.437 - 197.964K - 75.0464K^3}{609.892 - 697.02K + 199.149K^2 + 43.8068K^3}.$$

Figure 6:
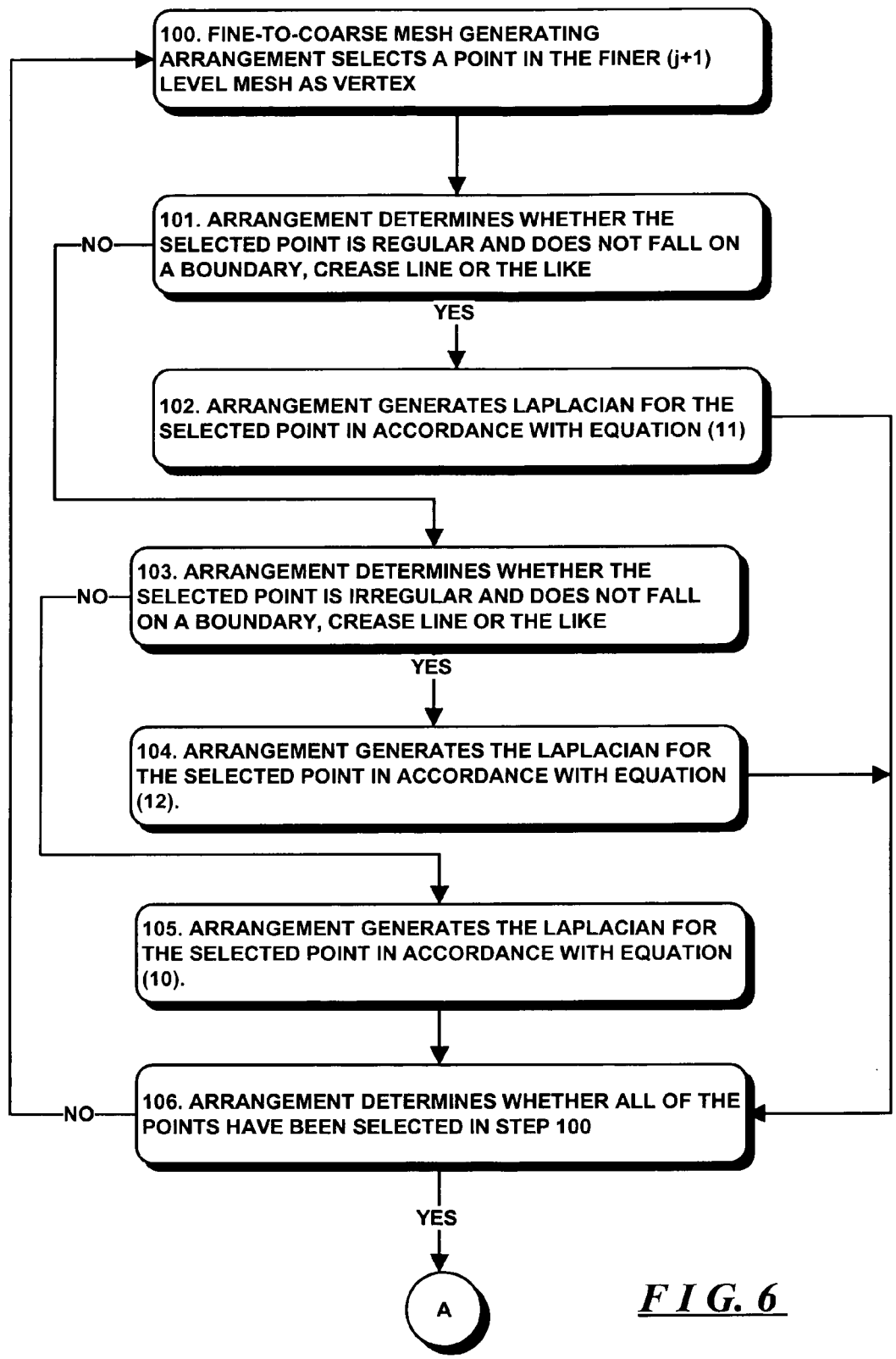
FIGS. 6, 6A through 6E depict a flow chart describing operations performed by the fine-to-coarse level mesh generating arrangement in connection with triangular meshes.
Figure 6A:
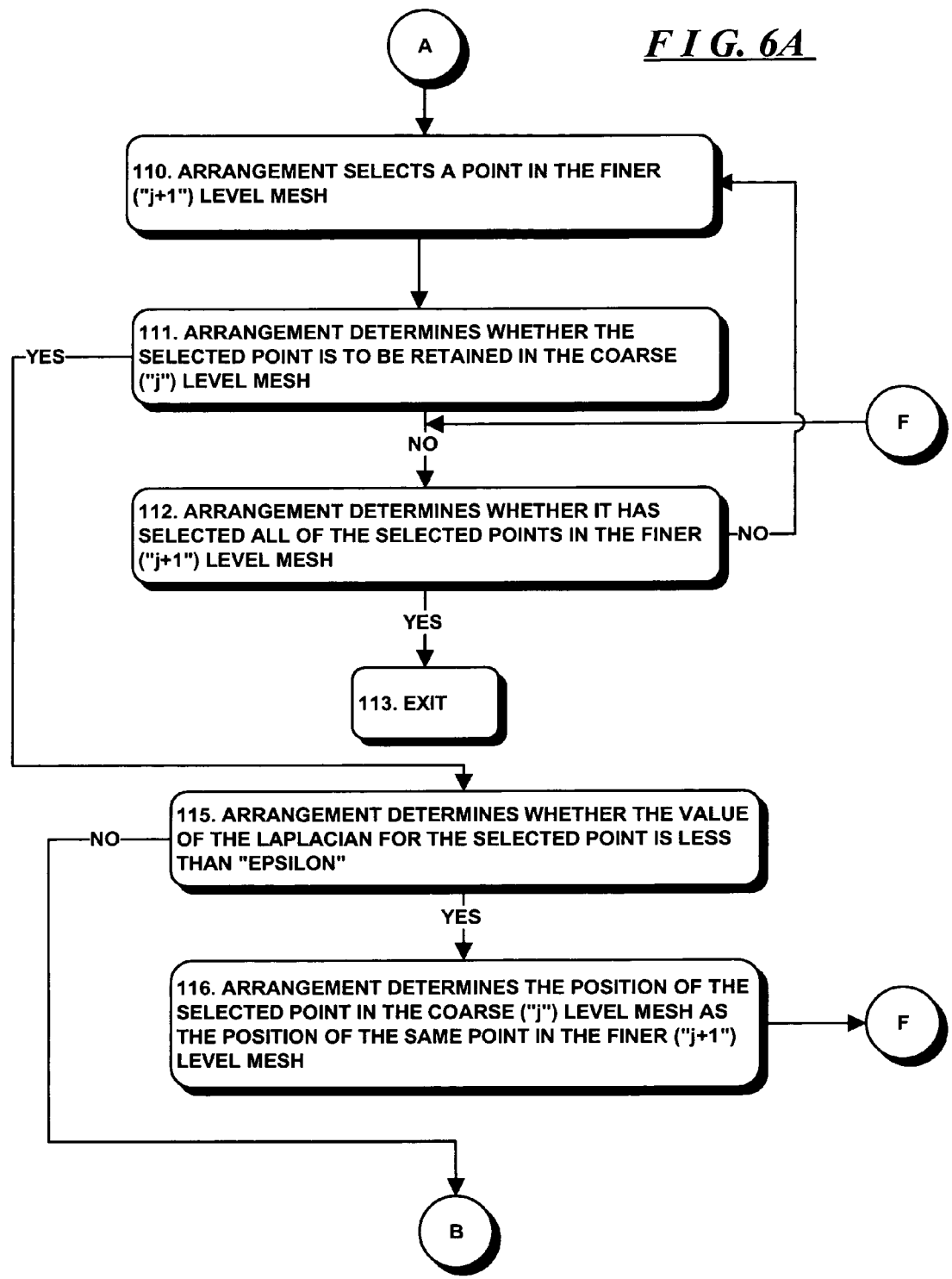
Figure 6B:
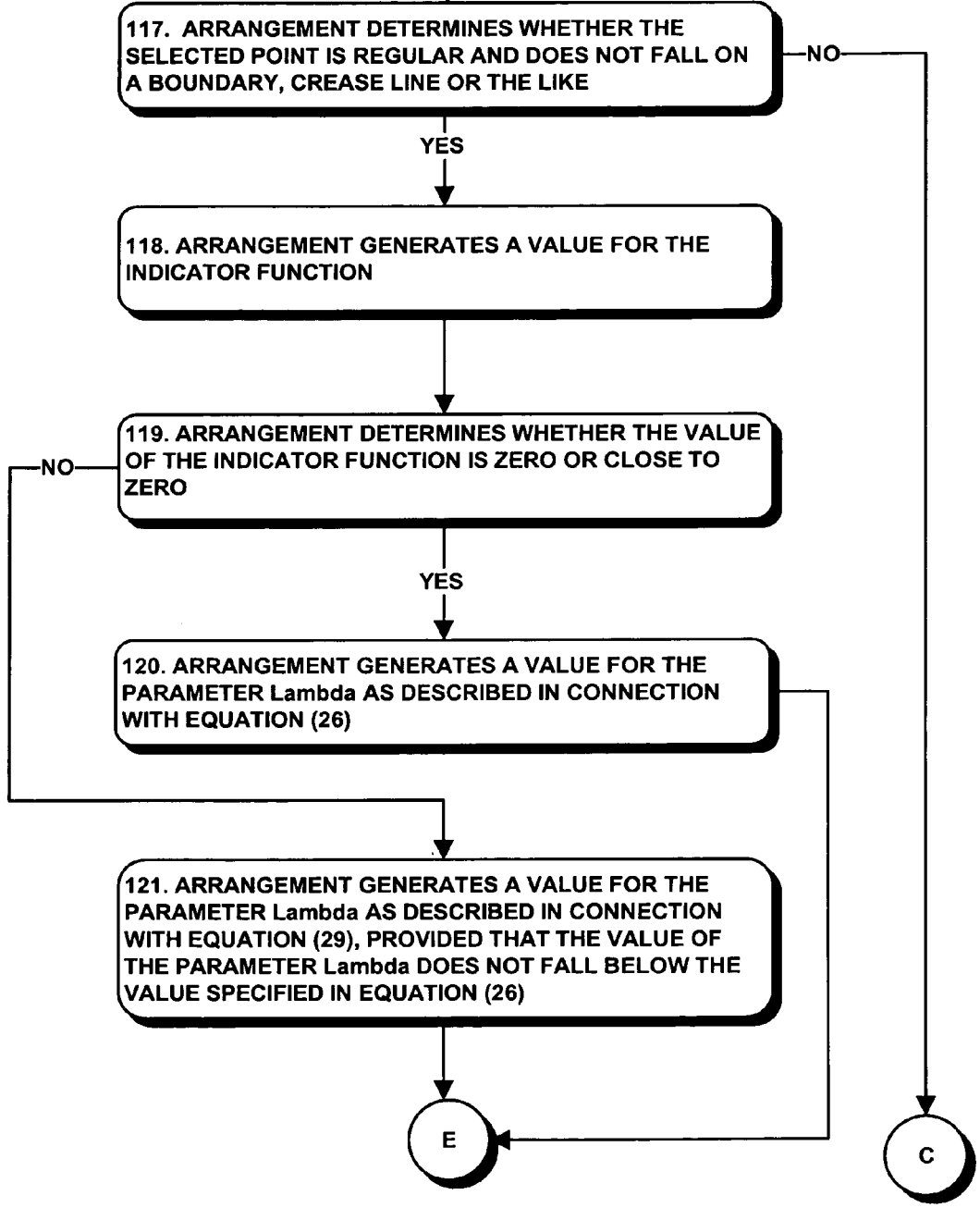
Figure 6C:
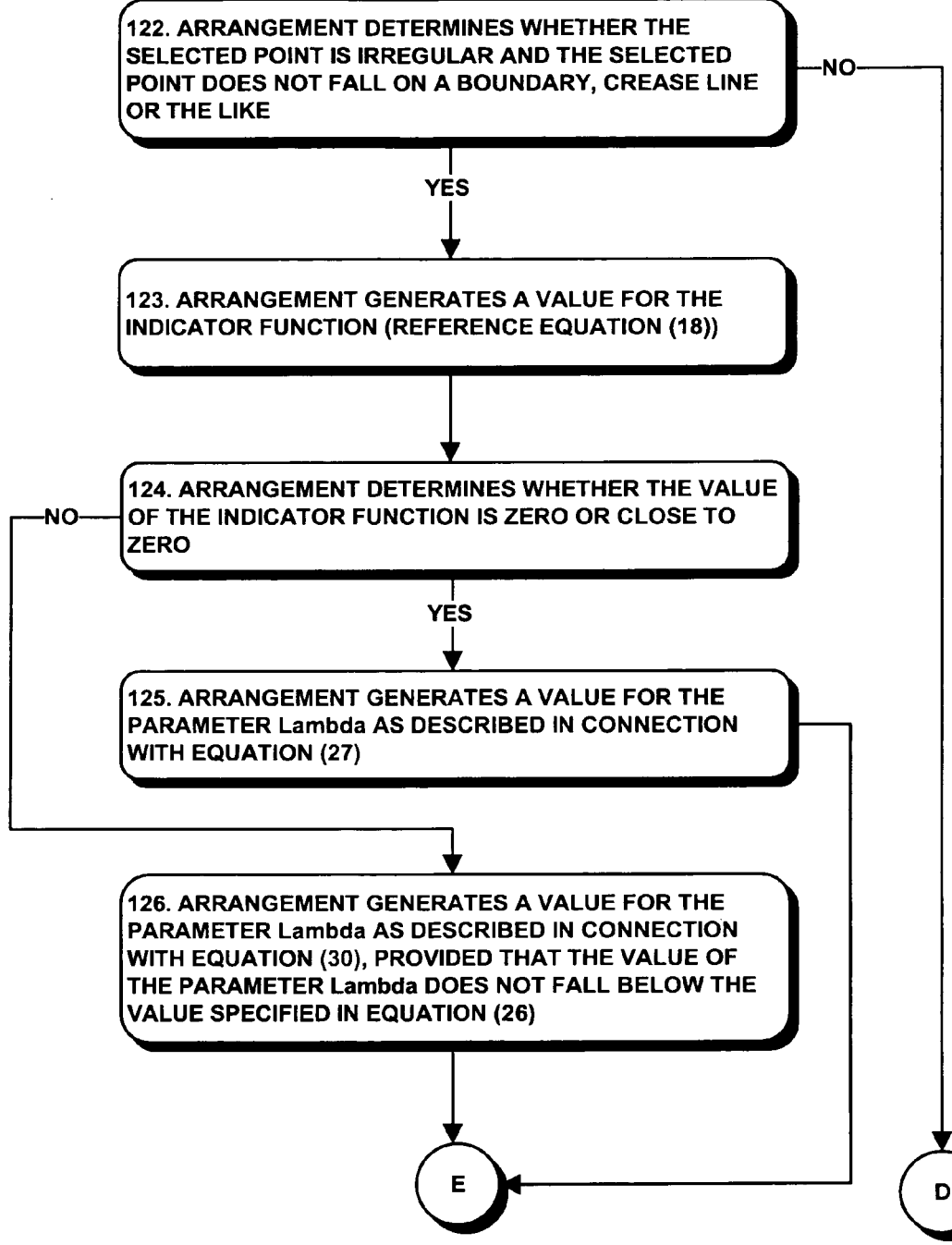
Figure 6D:
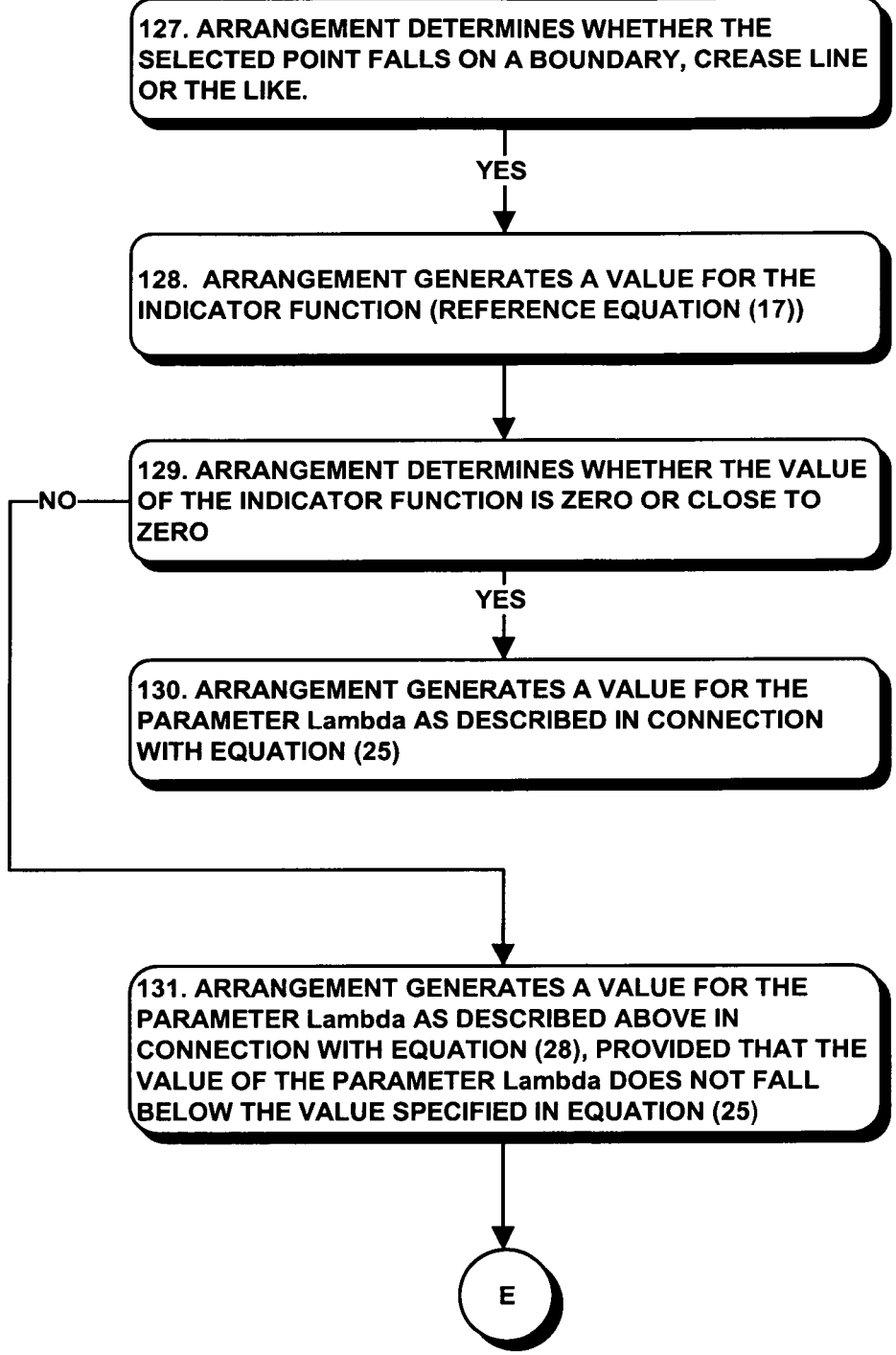
Figure 6E:
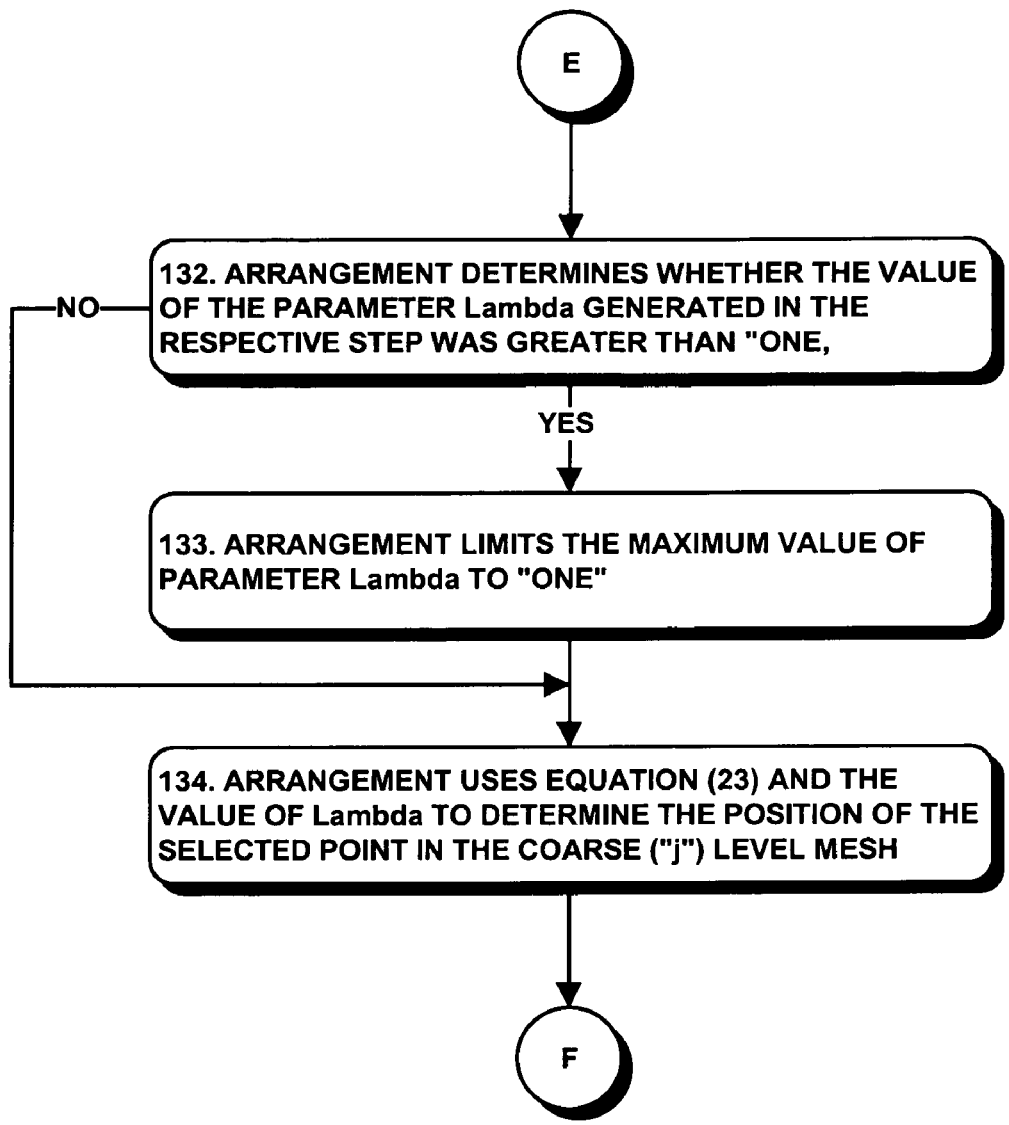
Figure 7:
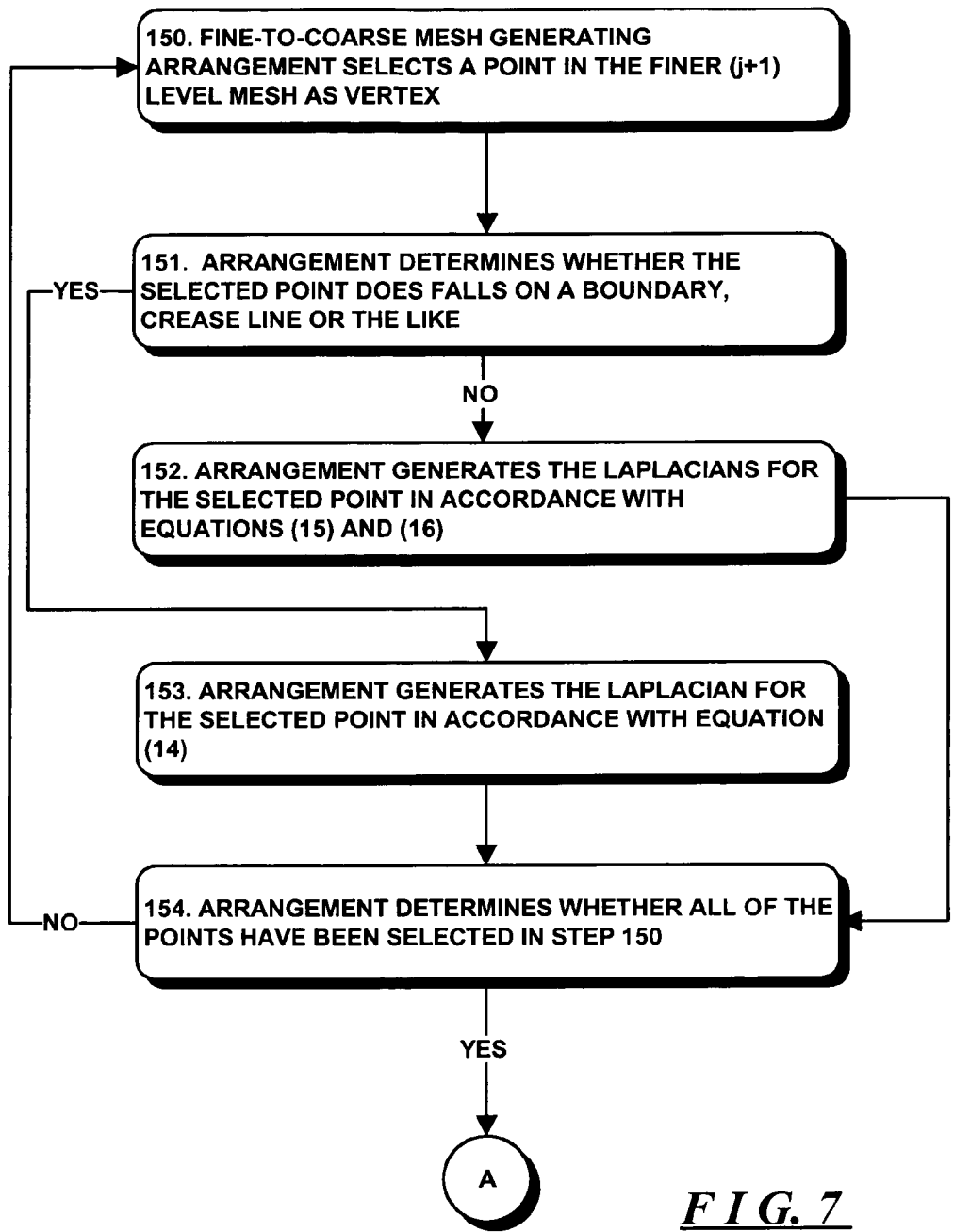
FIGS. 7, 7A through 7D depict a flow chart describing operations performed by the fine-to-coarse level mesh generating arrangement in connection with quadrilateral meshes.
Figure 7A:
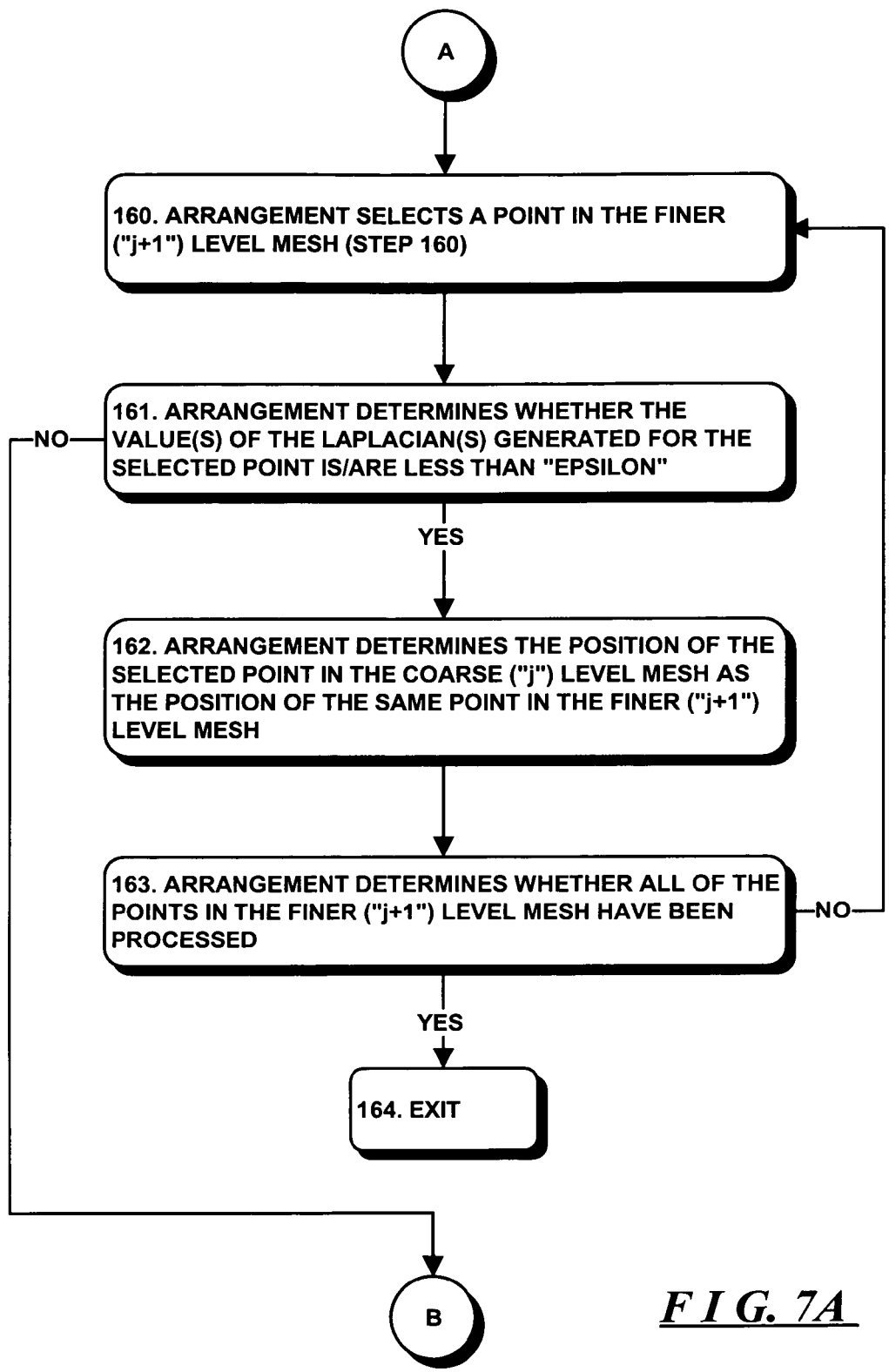
Figure 7B:
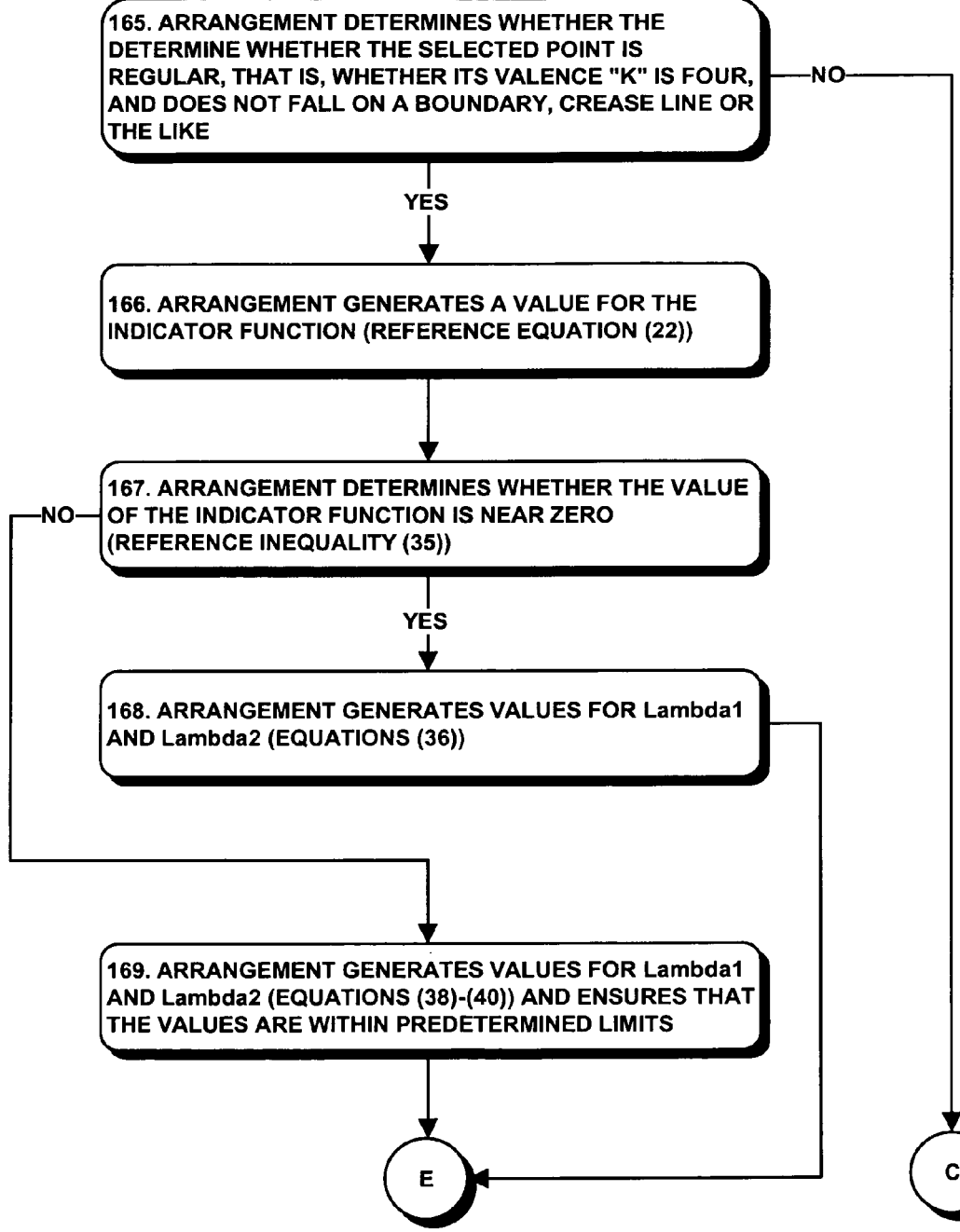
Figure 7C:
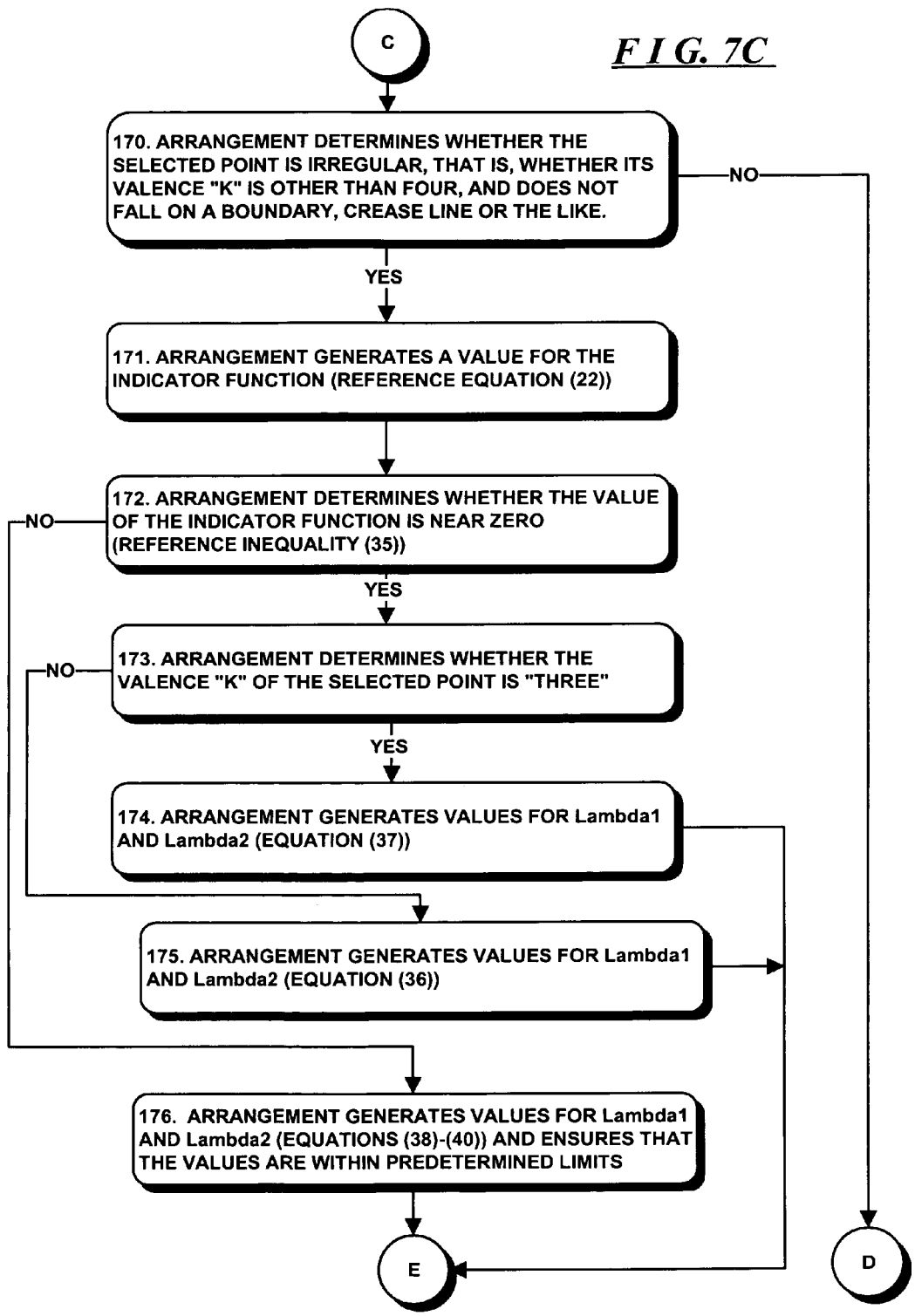
Figure 7D:
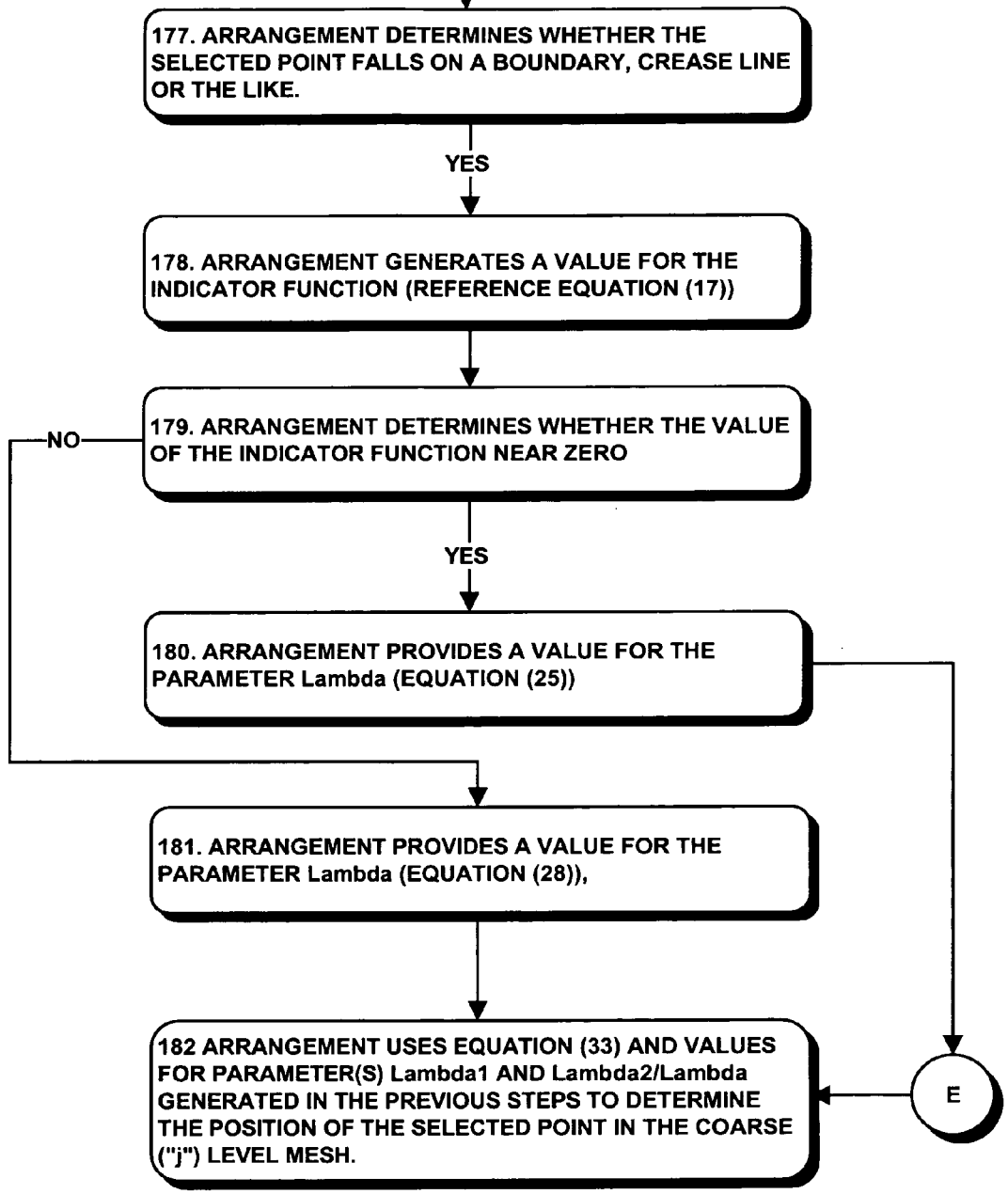

With this background, the operations performed by the fine-to-coarse mesh generating arrangement in generating a coarse ("j") level mesh from a finer ("j+1") level mesh will be described in connection with the flow charts in FIGS. 6 and 7. The flow chart in FIG. 6 depicts the operations performed in connection with a triangular mesh and the flow chart in FIG. 7 depicts the operations performed in connection with a quadrangular mesh. With reference initially to FIG. 6, the arrangement will first perform a series of steps to generate the Laplacian (equations (10) through (12)) for each of the points in the triangular finer ("j+1") level mesh. Initially, the arrangement will select a point in the finer (j+1) level mesh as vertex (step 100) and determine whether the point is regular, that is, whether its valence "K" is six, and does not fall on a boundary, crease line or the like (step 101). If the arrangement makes a positive determination in step 101, it proceeds to step 102 in which it generates the Laplacian for the point selected in step 100 in accordance with equation (11).

On the other hand, if the arrangement makes a negative determination in step 101, it will determine whether the point is irregular, that is, whether its valence "K" is less than six and does not fall on a boundary, crease line or the like (step 103). If the arrangement makes a positive determination in step 103, it proceeds to step 104 in which it generates the Laplacian for the point selected in step 100 in accordance with equation (12).

Finally, if the arrangement makes a negative determination in step 103, which will be the case if the point falls on a boundary, crease line or the like, it proceeds to step 105 in which it generates the Laplacian for the point selected in step 100 in accordance with equation (10).

Following step 102, 104 or 105, the arrangement will determine whether all of the points have been selected in step 100 (step 106). If the arrangement makes a negative determination in step 106, it will not have generated Laplacians for all of the points in the finer ("j+1") level mesh, and, in that case, it will return to step 100 to select another point and perform respective steps 101 through 105 in connection therewith. The arrangement performs step 100 and respective steps 101 through 105 through a plurality of iterations, in each iteration selecting and generating the Laplacian for each of the points in the finer ("j+1") level mesh.

After all of the points have been selected and Laplacians generated therefor, the arrangement will make a positive determination in step 106, at which point it will sequence to a series of steps in which the arrangement determines the positions $c^j(q)$ for points in the finer ("j+1") level mesh that are to be retained in the coarse ("j") level mesh. In those operations, the arrangement will select a point in the finer ("j+1") level mesh (step 110) and determine whether the point is to be retained in the coarse ("j") level mesh (step 111). If the arrangement makes a negative determination in step 111, the point is not to be retained in the coarse ("j") level mesh. In that case, the arrangement will sequence to a step 112 in which it determines whether it has selected all of the points in the finer ("j+1") level mesh. If the arrangement makes a negative determination in step 112, it will return to step 110 to select another point in the finer ("j+1") level mesh. On the other hand, if the arrangement makes a positive determination in step 112, which will be the case if it has processed all of the points in the finer ("j+1") level mesh, it will exit (step 113). The arrangement can make use of any of a number of methodologies in determining whether a point in the finer ("j+1") level mesh will be retained in the coarse ("j") level mesh. For example, given a suitable point indexing methodology, as will be apparent to those skilled in the art, the arrangement can determine whether a point in the finer ("j+1") level mesh will be retained in the coarse ("j") level mesh.

Returning to step 111, if the arrangement makes a positive determination in that step, which will be the case if the selected point in the finer ("j+1") level mesh will be retained, the arrangement sequences to step 115, in which it determines whether the value of the Laplacian for the point selected in step 110 is less than "ϵ" (reference inequality (24)). If the arrangement makes a positive determination in step 115, it determines the position $c^j(q)$ of the point in the coarse ("j") level mesh as the position $c^{j+1}(q)$ of the corresponding point in the finer ("j+1") level mesh (step 116). Following step 116, the arrangement will sequence to step 112 to determine whether all of the points in the finer ("j+1") level mesh have been processed, and, if not, return to step 110 to select another point, and, if so, exit.

Returning to step 115, if the arrangement makes a negative determination in that step, it will sequence to step 117, in which it will determine whether the point is regular, that is, whether its valence "K" is six, and does not fall on a boundary, crease line or the like. If the arrangement makes a positive determination in that step, it will generate a value for the indicator function (reference equation (18)) (step 118). The arrangement will then determine whether the value of the indicator function is zero or close to zero (step 119). If the arrangement makes a positive determination in step 119, it will provide a value for the parameter λ as described above in connection with equation (26) (step 120). On the other hand, if the arrangement makes a negative determination in step 119, it will provide a value for the parameter λ as described above in connection with equation (29), provided that the value of the parameter λ does not fall below the value specified in equation (26) (step 121).

Returning to step 117, if the arrangement makes a negative determination in that step, it will sequence to step 122 to determine whether the point is irregular, that is, whether its valence "K" is not equal to six, and the point does not fall on a boundary, crease line or the like. If the arrangement makes a positive determination in that step, it will generate a value for the indicator function (reference equation (18)) (step 123). The arrangement will then determine whether the value of the indicator function is zero or close to zero (step 124). If the arrangement makes a positive determination in step 124, it will provide a value for the parameter λ as described above in connection with equation (27) (step 125). On the other hand, if the arrangement makes a negative determination in step 124, it will provide a value for the parameter λ as described above in connection with equation (30), provided that the value of the parameter λ does not fall below the value specified in equation (26) (step 126).

Returning to step 122, if the arrangement makes a negative determination in that step, it will sequence to step 127 to determine whether the point falls on a boundary, crease line or the like. If the arrangement makes a positive determination in that step, it will generate a value for the indicator function (reference equation (17)) (step 128). The arrangement will then determine whether the value of the indicator function is zero or close to zero (step 129). If the arrangement makes a positive determination in step 129, it will provide a value for the parameter λ as described above in connection with equation (25) (step 130). On the other hand, if the arrangement makes a negative determination in step 129, it will provide a value for the parameter λ as described above in connection with equation (28), provided that the value of the parameter λ does not fall below the value specified in equation (25) (step 131).

Following step 120, 121, 125, 126, 130, or 131, the arrangement will sequence to step 132, in which it determines whether the value of the parameter λ generated in the respective step was greater than "one," and, if so, limit the maximum value of parameter λ to "one" (step 133). Thereafter, the arrangement uses equation (23) to determine the position $c^{j+1}(q)$ of the point in the coarse ("j") level mesh (step 134).

Following step 134, the arrangement the arrangement will sequence to step 112 to determine whether all of the points in the finer ("j+1") level mesh have been processed, and, if not, return to step 110 to select another point, and, if so, exit.

The flow chart in FIG. 7 depicts the operations performed in connection with a quadrangular mesh. With reference to FIG. 7, the arrangement will first perform a series of steps to generate the Laplacians (equations (14) through (16)) for each of the points in the quadrilateral finer ("j+1") level mesh. Initially, the arrangement will select a point in the finer (j+1) level mesh as vertex (step 150) and determine whether the point does not fall on a boundary, crease line or the like (step 151). If the arrangement makes a positive determination in step 151, it proceeds to step 152 in which it generates the Laplacian for the point selected in step 150 in accordance with equations (15) and (16).

On the other hand, if the arrangement makes a negative determination in step 151, which will be the case if the point falls on a boundary, crease line or the like, it proceeds to step 153 in which it generates the Laplacian for the point selected in step 150 in accordance with equation (14).

Following step 152 or 153, the arrangement will determine whether all of the points have been selected in step 150 (step 154). If the arrangement makes a negative determination in step 154, it will not have generated Laplacians for all of the points in the finer ("j+1") level mesh, and, in that case, it will return to step 150 to select another point and perform respective steps 151 through 153 in connection therewith. The arrangement performs step 150 and respective steps 151 through 153 through a plurality of iterations, in each iteration selecting and generating the Laplacian for each of the points in the finer ("j+1") level mesh.

After all of the points have been selected and Laplacians generated therefor, the arrangement will make a positive determination in step 154, at which point it will sequence to a series of steps in which the arrangement determines the positions $c^j(q)$ for respective points in the coarse ("j") level mesh using the positions $c^{j+1}(q)$ of the points in the finer ("j+1") level mesh and the values of parameters to be generated and the Laplacians generated in steps 150 through 153. Initially, the arrangement will select a point in the finer ("j+1") level mesh (step 160) and determine whether the values of both Laplacians $L_e(k,j+1)$ and $L_f(k,j+1)$ generated for the point selected instep 160 are less than "ε" (reference inequality (34)) (step 161). If the arrangement makes a positive determination in step 161, it determines the position $c^j(q)$ of the point in the coarse ("j") level mesh as the position $c^{j+1}(q)$ of the same point in the finer ("j+1") level mesh (step 162). Following step 162, the arrangement will sequence to step 163 to determine whether all of the points in the finer ("j+1") level mesh have been processed, and, if not, return to step 160 to select another point. On the other hand, if the arrangement makes a positive determination in step 163, it will exit (step 164).

Returning to step 161, if the arrangement makes a negative determination in that step, it will sequence to step 165, in which it determines whether the determine whether the point is regular, that is, whether its valence "K" is four, and does not fall on a boundary, crease line or the like. If the arrangement makes a positive determination in step 165, it will generate a value for the indicator function (reference equation (22)) (step 166) and determine whether the value of the indicator function is near zero (reference inequality (35)) (step 167). If the arrangement makes a positive determination in step 167, it will generate values for $\lambda_1$ and $\lambda_2$ as described above in connection with equations (36) (step 168). On the other hand, if the arrangement makes a negative determination in step 167, it will generate values for $\lambda_1$ and $\lambda_2$ as described above in connection with equations (38)–(40), in the process ensuring that the values of $\lambda_1$ and $\lambda_2$ are within predetermined limits ($-4 \leq \lambda_1 \leq \frac{1}{2}$, $\frac{1}{4} \leq \lambda_2 < 1$) (step 169).

Returning to step 165, if the arrangement makes a negative determination in that step, it will sequence to step 170, in which it determines whether the point is irregular, that is, whether its valence "K" is other than four, and does not fall on a boundary, crease line or the like. If the arrangement makes a positive determination in step 170, it will generate a value for the indicator function (reference equation (22)) (step 171) and determine whether the value of the indicator function is near zero (reference inequality (35)) (step 172). If the arrangement makes a positive determination in step 172, it determine whether the valence "K" of the point is "three" (step 173). If the arrangement makes a positive determination in step 173, it will generate values for $\lambda_1$ and $\lambda_2$ as described above in connection with equation (37) (step 174). On the other hand, if the arrangement makes a negative determination in step 173, it will generate values for $\lambda_1$ and $\lambda_2$ as described above in connection with equation (36) (step 175). Returning to step 172, if the arrangement makes a negative determination in step 172, which will be the case if the value for the indicator function as generated in step 171 is not near zero, it will generate values for $\lambda_1$ and $\lambda_2$ as described above in connection with equations (38)–(40), in the process ensuring that the values of $\lambda_1$ and $\lambda_2$ are within predetermined limits $$\left(-\frac{4}{K-3} \leq \lambda_1 \leq \frac{1}{2}, \frac{1}{4} \leq \lambda_2 \leq \frac{1}{K-3}\right)$$

(step 176).

Returning to step 170, if the arrangement makes a negative determination in that step, it will sequence to step 177 to determine whether the point falls on a boundary, crease line or the like. If the arrangement makes a positive determination in that step, it will generate a value for the indicator function (reference equation (17)) (step 178). The arrangement will then determine whether the value of the indicator function is zero or near zero (reference inequality (35) above) (step 179). If the arrangement makes a positive determination in step 179, it will provide a value for the parameter λ as described above in connection with equation

(25) (step 180). On the other hand, if the arrangement makes a negative determination in step 179, it will provide a value for the parameter λ as described above in connection with equation (28) (step 181).

Following step 168, 169, 174, 175, 180, or 181, the arrangement will sequence to step 182, in which it uses equation (33) and values for parameters $\lambda_1$ and $\lambda_2$ generated in the previous steps to determine the position $c^{j+1}(q)$ of the point in the coarse ("j") level mesh. Following step 182, the arrangement will sequence to step 163 to determine whether all of the points in the finer ("j+1") level mesh have been processed, and, if not, return to step 160 to select another point, and, of so, sequence to step 164 to exit.

The arrangement provides a number of advantages. In particular, the invention provides an arrangement for generating a coarse ("j") level mesh representing a surface, from a finer ("j+1") level mesh surface representation. The arrangement makes use of an indicator function to provide an indication as to which of several methodologies is be used at respective ones of the points in the finer ("j+1") level mesh, including a subdivision-inverse filter methodology and a least-squares optimization methodology.

It will be appreciated that numerous changes and modifications may be made to the arrangement as described herein. For example, it will be appreciated that, although the arrangement has been described in connection with meshes of triangular and quadrangular faces, it will be appreciated that the arrangement may find utility in connection with meshes having faces of different polygonal structures. In addition, although equations for generating the indicator functions and parameters may differ than the specific ones described herein.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:
    A. computer-readable program instructions executable to provide an indicator value generator module configured to enable the computer to, for respective ones of the points in the finer level surface representation, evaluate an indicator function to generate an indicator value;
    B. computer-readable program instructions executable to provide a coarse level mesh generator module configured to enable the computer to determine, for each of the points; and
    C. computer-readable program instructions executable to provide a Laplacian generator module configured to enable the computer to generate a Laplacian value for said respective ones of the points in the finer level mesh representation;
    in which the Laplacian generator module is configured to generate the Laplacian value L(k,j+1), for at least one of said points, said at least one of said points comprising a point on a boundary, crease line or the like in a triangular mesh representation, in accordance with $$L(k, j+1) = \frac{1}{2}[c^{j+1}(k-1) + c^{j+1}(k+1)] - c^{j+1}(k)$$

where $c^{j+1}(k)$ represents the position of the point for which the Laplacian is being generated in the finer level mesh representation, and $c^{j+1}(k-1)$ and $c^{j+1}(k+1)$ represent the positions of neighboring points in the finer level mesh representation.

2. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:
    A. computer-readable program instructions executable to provide an indicator value generator module configured to enable the computer to, for respective ones of the points in the finer level surface representation, evaluate an indicator function to generate an indicator value;
    B. computer-readable program instructions executable to provide a coarse level mesh generator module configured to enable the computer to determine, for each of the points; and
    C. computer-readable program instructions executable to provide a Laplacian generator module configured to enable the computer to generate a Laplacian value for said respective ones of the points in the finer level mesh representation;
    in which the Laplacian generator module is configured to generate the Laplacian value L(k,j+1), for at least one of said points, said at least one of said points comprising a regular vertex, that is, for a vertex for which the valence "K" is equal to "six," in a triangular mesh representation, in accordance with $$L(k, j+1) = \frac{1}{6}\left(\sum_{l \in N(k,j+1)} c^{j+1}(l)\right) - c^{j+1}(k)$$

where $c^{j+1}(k)$ represents the position of the point for which the Laplacian is being generated in the finer level mesh representation, and $c^{j+1}(l)$ represents the positions of neighboring points in the finer level mesh representation.

3. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones of the points in the finer level mesh representation;

in which the Laplacian generator module is configured to generate the Laplacian value L(k,j+1), for at least one of said points, said at least one of said points comprising a for a irregular vertex, that is, for a vertex for which the valence "K" is not equal to "six," in a triangular mesh representation, in accordance with $$L(k, j+1) = \rho \left[ \frac{1}{K} \sum_{l \in N(k,j+1)} c^{j+1}(l) - c^{j+1}(k) \right]$$

where $c^{j+1}(k)$ represents the position of the point for which the Laplacian is being generated in the finer level mesh representation, and $c^{j+1}(l)$ represents the positions of neighboring points in the finer level mesh representation, $$\rho = -\frac{3 + 8\,a(K)}{3(-5 + 8\,a(K))}, \text{ and } a(K) = \frac{5}{8} - \left(\frac{3 + 2\cos\left(\frac{2\pi}{K}\right)}{8}\right)^2.$$

4. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones at me points in the finer level mesh representation;

in which the Laplacian generator module is configured to generate the Laplacian value L(k,j+1), for at least one of said points, said at least one of said points comprising a point on a boundary, crease line or the like in a quadrilateral mesh representation, in accordance with $$L(k, j+1) = \frac{1}{2}(c^{j+1}(k-1) + c^{j+1}(k+1)) - c^{j+1}(k)$$

where $c^{j+1}(k)$ is the position of the vertex for which the Laplacian is being generated, and $c^{j+1}(k-1)$ and $c^{j+1}(k+1)$ are the positions of the neighboring points in the fine level mesh representation.

5. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones of the points in the finer level mesh representation;

in which the Laplacian generator module is configured to generate Laplacian values $L_e(k,j+1)$ and $L_f(k,j+1)$, for at least one of said points, said at least one of said points comprising a point on a boundary, crease line or the like in a quadrilateral mesh representation, in accordance with $$L_e(k, j+1) = \frac{1}{K} \left( \sum_{l \in N_e(k,j+1)} c^{j+1}(l) \right) - c^{j+1}(k)$$

and $$L_f(k, j+1) = \frac{1}{K} \left( \sum_{l \in N_f(k,j+1)} c^{j+1}(l) \right) - c^{j+1}(k)$$

where $N_e(k,j+1)$ references a set of points comprising first order neighbors of the at least one of said points in the finer level mesh representation, and $N_f(k,j+1)$ references a set of points comprising second order neighbors of the at least one operating system said points in the finer level mesh representation.

6. A computer-readable program product as defined in claim 5 in which the coarse level mesh generator module is configured to determine, for at least one of the points that are to be provided in the coarse level mesh representation, the position in the coarse level mesh representation as the position of the corresponding point in the finer level mesh representation if the magnitude both Laplacian values $L_e(k, j+1)$ and $L_f(k,j+1)$ generated by the Laplacian generator module are below a predetermined threshold value.

7. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones of the points in the finer level mesh representation;

in which the coarse level mesh generator module is configured to determine, for each of the points that are to be provided in the coarse level mesh representation, a position in the coarse level mesh representation in response to the position of the corresponding point in the finer level mesh representation, in accordance with the subdivision-inverse filter methodology if the magnitude of the indicator value is below a selected threshold value; and in which the coarse level mesh generator module is configured to determine, for at least one of said points, comprising a point on a boundary, crease line or the like in a triangular mesh representation, for which the magnitude of the indicator value is below the selected threshold value, a position $c^j(k)$ in the coarse level mesh representation in accordance with $$c^j(k)=c^{j+1}(k)+\lambda\, L(k,j+1)$$

where $c^{j+1}(k)$ represents the position of the corresponding point in the finer level mesh representation, $L(k,j+1)$ represents the Laplacian value generated by the Laplacian generator module for the point in the finer level mesh representation, and $\lambda$ represents a parameter whose value is $\lambda=-1$.

8. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones of the points in the finer level mesh representation;

in which the coarse level mesh generator module is configured to determine, for each of the points that are to be provided in the coarse level mesh representation, a position in the coarse level mesh representation in response to the position of the corresponding point in the finer level mesh representation, in accordance with the subdivision-inverse filter methodology if the magnitude of the indicator value is below a selected threshold value; and in which the coarse level mesh generator module is configured to determine, for at least one of said points in a triangular mesh representation, comprising a regular point, that is, a point whose valence "K" is equal to "six," and is not on a boundary, crease line or the like, for which the magnitude of the indicator value is below the selected threshold value, a position $c^j(k)$ in the coarse level mesh representation in accordance with $$c^j(k)=c^{j+1}(k)+\lambda\, L(k,j+1)$$

where $c^{j+1}(k)$ represents the position of the corresponding point in the finer level mesh representation, $L(k,j+1)$ represents the Laplacian value generated by the Laplacian generator module for the point in the finer level mesh representation, and $\lambda$ represents a parameter whose value is $\lambda=-3/2$.

9. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones of the points in the finer level mesh representation;

in which the coarse level mesh generator module is configured to determine, for each of the points that are to be provided in the coarse level mesh representation, a position in the coarse level mesh representation in response to the position of the corresponding point in the finer level mesh representation, in accordance with the subdivision-inverse filter methodology if the magnitude of the indicator value is below a selected threshold value; and in which the coarse level mesh generator module is configured to determine, for at least one of said points in a triangular mesh representation, comprising an irregular point, that is, a point whose valence "K" is not equal to "six," and is not on a boundary, crease line or the like, for which the magnitude of the indicator value is below the selected threshold value, a position $c^j(k)$ in the coarse level mesh representation in accordance with $$c^j(k)=c^{j+1}(k)+\lambda\, L(k,j+1)$$

where $c^{j+1}(k)$ represents the position of the corresponding point in the finer level mesh representation, $L(k,j+1)$ represents the Laplacian value generated by the Laplacian generator module for the point in the finer level mesh representation, and $\lambda$ represents a parameter whose value is generated in accordance with $$\lambda = \frac{8\,a(K)}{-5+8\,a(K)}, \text{ where } a(K) = \frac{5}{8} - \left(\frac{3+2\cos\left(\frac{2\pi}{K}\right)}{8}\right)^2.$$

10. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones of the points in the finer level mesh representation;

in which the coarse level mesh generator module is configured to determine, for each of the points that are to be provided in the coarse level mesh representation, a position in the coarse level mesh representation in response to the position of the corresponding point in the finer level mesh representation, in accordance with the subdivision-inverse filter methodology if the magnitude of the indicator value is below a selected threshold value; and in which the coarse level mesh generator module is configured to determine, for at least one of said points, comprising a point on a boundary, crease line or the like in a quadrilateral mesh representation, for which the magnitude of the indicator value is below the selected threshold value, a position $c^j(k)$ in the coarse level mesh representation in accordance with $$c^j(k) = c^{j+1}(k) + \lambda\, L(k, j+1)$$

where $c^{j+1}(k)$ represents the position of the corresponding point in the finer level mesh representation, $L(k,j+1)$ represents the Laplacian value generated by the Laplacian generator module for the point in the finer level mesh representation, and $\lambda$ represents a parameter whose value is $\lambda = -1$.

11. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones of the points in the finer level mesh representation;

in which the coarse level mesh generator module is configured to determine, for each of the points that are to be provided in the coarse level mesh representation, a position in the coarse level mesh representation in response to the position of the corresponding point in the finer level mesh representation, in accordance with the subdivision-inverse filter methodology if the magnitude of the indicator value is below a selected threshold value; and in which the coarse level mesh generator module is configured to determine, for at least one of said points in a quadrilateral mesh representation, which is not on a boundary, crease line or the like, for which the magnitude of the indicator value is below the selected threshold value, a position $c^j(k)$ in the coarse level mesh representation in accordance with $$c^j(k) = c^{j+1}(k) + \lambda_1\, L_e(k, j+1) + \lambda_2\, L_f(k, j+1)$$

where $c^{j+1}(k)$ represents the position of the corresponding point in the finer level mesh representation, $L_e(k,j+1)$ and $L_f(k,j+1)$ represent Laplacian values generated by the Laplacian generator module for the point in the finer level mesh representation, and $\lambda_1$ and $\lambda_2$ represent parameters whose values are generated in accordance with, if the valence "K" of the point not equal to "three,"

$$\lambda_1 = -\frac{4}{K-3}$$

$$\lambda_2 = \frac{1}{K-3}$$

and, if the valence "K" for the vertex is equal to "three," $\lambda_1 = -8$, $\lambda_2 = -2$.

12. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:

A. computer-readable program instructions executable to provide an indicator value generator module configured to enable the computer to, for respective ones of the points in the finer level surface representation, evaluate an indicator function to generate an indicator value;

B. computer-readable program instructions executable to provide a coarse level mesh generator module configured to enable the computer to determine, for each of the points; and C. computer-readable program instructions executable to provide a Laplacian generator module configured to enable the computer to generate a Laplacian value for said respective ones of the points in the finer level mesh representation;

in which the coarse level mesh generator module is configured to determine, for each of the points that are to be provided in the coarse level mesh representation, a position in the coarse level mesh representation in response to the position of the corresponding point in the finer level mesh representation, in accordance with the least-squares optimization methodology if the magnitude of the indicator value is above a selected threshold value; and in which the coarse level mesh generator module is configured to determine, for at least one of said points, comprising a point on a boundary, crease line or the like in a triangular mesh representation, for which the magnitude of the indicator value is not below the selected threshold value, a position $c^j(k)$ in the coarse level mesh representation in accordance with $$c^j(k) = c^{j+1}(k) + \lambda\, L(k, j+1)$$

where $c^{j+1}(k)$ represents the position of the corresponding point in the finer level mesh representation, $L(k,j+1)$ represents the Laplacian value generated by the Laplacian generator module for the point in the finer level mesh representation, and $\lambda$ represents a parameter whose value is generated in accordance with $$\lambda = \frac{1}{L(k)}\left[ b_0^{1D} L(k) + \frac{1}{2} b_1^{1D}(L(k-1) + L(k+1)) \right]$$

where $$b_0^{1D} = -\frac{12}{35} \text{ and } b_1^{1D} = -\frac{23}{49},$$

and $L(k-1)$ and $L(k+1)$ represent Laplacian values generated by the Laplacian generator module for neighboring points in the finer level mesh representation.

13. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:
  A. computer-readable program instructions executable to provide an indicator value generator module configured to enable the computer to, for respective ones of the points in the finer level surface representation, evaluate an indicator function to generate an indicator value;
  B. computer-readable program instructions executable to provide a coarse level mesh generator module configured to enable the computer to determine, for each of the points; and
  C. computer-readable program instructions executable to provide a Laplacian generator module configured to enable the computer to generate a Laplacian value for said respective ones of the points in the finer level mesh representation;
  in which the coarse level mesh generator module is configured to determine, for each of the points that are to be provided in the coarse level mesh representation, a position in the coarse level mesh representation in response to the position of the corresponding point in the finer level mesh representation, in accordance with the least-squares optimization methodology if the magnitude of the indicator value is above a selected threshold value; and
  in which the coarse level mesh generator module is configured to determine, for at least one of said points in a triangular mesh representation, comprising a regular point, that is, a point whose valence "K" is equal to "six," and is not on a boundary, crease line or the like, for which the magnitude of the indicator value is not below the selected threshold value, a position $c^j(k)$ in the coarse level mesh representation in accordance with $$c^j(k) = c^{j+1}(k) + \lambda\, L(k, j+1)$$

where $c^{j+1}(k)$ represents the position of the corresponding point in the finer level mesh representation, $L(k,j+1)$ represents the Laplacian value generated by the Laplacian generator module for the point in the finer level mesh representation, and $\lambda$ represents a parameter whose value is $$\lambda = \frac{1}{L(k)}\left[ b_0^{reg} L(k) + \frac{1}{6} b_1^{reg} \sum_{l \in N(k,j+1)} L(l) \right]$$

where $$b_0^{reg} = -\frac{61}{5720} \text{ and } b_1^{reg} = -\frac{14403}{5720}$$

and $L(l)$ represent Laplacian values generated by the Laplacian operator for points, identified by indices $N(k,j+1)$, that neighbor teat least one of said points.

14. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:
  A. computer-readable program instructions executable to provide an indicator value generator module configured to enable the computer to, for respective ones of the points in the finer level surface representation, evaluate an indicator function to generate an indicator value;
  B. computer-readable program instructions executable to provide a coarse level mesh generator module configured to enable the computer to determine, for each of the points; and
  C. computer-readable program instructions executable to provide a Laplacian generator module configured to enable the computer to generate a Laplacian value for said respective ones of the points in the finer level mesh representation;
  in which the coarse level mesh generator module is configured to determine, for each of the points that are to be provided in the coarse level mesh representation, a position in the coarse level mesh representation in response to the position of the corresponding point in the finer level mesh representation, in accordance with the least-squares optimization methodology if the magnitude of the indicator value is above a selected threshold value; and
  in which the coarse level mesh generator module is configured to determine, for at least one of said points in a triangular mesh representation, comprising an irregular point, that is, a point whose valence "K" is not equal to "six," and is not on a boundary, crease line or the like, for which the magnitude of the indicator value is below the selected threshold value, a position $c^j(k)$ in the coarse level mesh representation in accordance with $$c^j(k) = c^{j+1}(k) + \lambda\, L(k, j+1)$$

where $c^{j+1}(k)$ represents the position of the corresponding point in the finer level mesh representation, $L(k,j+1)$ represents the Laplacian value generated by the Laplacian generator module for the point in the finer level mesh representation, and $\lambda$ represents a parameter whose value is generated in accordance with $$\lambda = \frac{1}{L(k)}\left[b_0^{irreg} L(k) + \frac{1}{K} b_1^{irreg} \sum_{l \in N(k,j+1)} L(l)\right],$$

where $$b_0^{irreg} = \frac{2(5-8a(K))(14647K - 391848\,a(K) + 391848\,a(k)^2)}{715(3+8\,a(k))(256+41K-512\,a(k)+256\,a(k)^2)}$$

and $$b_1^{irreg} = \frac{16(-5531K - 24521\,a(K) + 24521\,a(K)^2)}{715(256+41K-512\,a(K)+25\,a(K)^2)}$$

and where $$a(K) = \frac{5}{8} - \left(\frac{3 + 2\cos\left(\frac{2\pi}{K}\right)}{8}\right)^2.$$

15. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:
  A. computer-readable program instructions executable to provide an indicator value generator module configured to enable the computer to, for respective ones of the points in the finer level surface representation, evaluate an indicator function to generate an indicator value;
  B. computer-readable program instructions executable to provide a coarse level mesh generator module configured to enable the computer to determine, for each of the points; and
  C. computer-readable program instructions executable to provide a Laplacian generator module configured to enable the computer to generate a Laplacian value for said respective ones of the points in the finer level mesh representation;
  in which the coarse level mesh generator module is configured to determine, for each of the points that are to be provided in the coarse level mesh representation, a position in the coarse level mesh representation in response to the position of the corresponding point in the finer level mesh representation in accordance with the least-squares optimization methodology if the magnitude of the indicator value is above a selected threshold value; and
  in which the coarse level mesh generator module is configured to determine, for at least one of said points, comprising a point on a boundary, crease line or the like in a quadrilateral mesh representation, for which the magnitude of the indicator value is not below the selected threshold value, a position $c^j(k)$ in the coarse level mesh representation in accordance with $$c^j(k) = c^{j+1}(k) + \lambda\, L(k,j+1)$$

where $c^{j+1}(k)$ represents the position of the corresponding point in the finer level mesh representation, $L(k,j+1)$ represents the Laplacian value generated by the Laplacian generator module for the point in the finer level mesh representation, and $\lambda$ represents a parameter whose value is generated in accordance with $$\lambda = \frac{1}{L(k)}\left[b_0^{1D} L(k) + \frac{1}{2} b_1^{1D}(L(k=1) + L(k+1))\right]$$

where $$b_0^{1D} = -\frac{12}{35} \text{ and } b_1^{1D} = -\frac{23}{49},$$

and $L(k-1)$ and $L(k+1)$ represent Laplacian values generated by the Laplacian generator module for neighboring points in the finer level mesh representation.

16. A computer program product for use in connection with a computer to provide a fine-to-coarse level mesh generating arrangement for generating a coarse level mesh representation representing a surface, from a finer level mesh representation, the computer program product comprising a computer-readable medium having encoded thereon:
  A. computer-readable program instructions executable to provide an indicator value generator module configured to enable the computer to, for respective ones of the points in the finer level surface representation, evaluate an indicator function to generate an indicator value;
  B. computer-readable program instructions executable to provide a coarse level mesh generator module configured to enable the computer to determine, for each of the points; and
  C. computer-readable program instructions executable to provide a Laplacian generator module configured to enable the computer to generate a Laplacian value for said respective ones of the points in the finer level mesh representation;
  in which the coarse level mesh generator module is configured to determine, for each of the points that are to be provided in the coarse level mesh representation, a position in the coarse level mesh representation in response to the position of the corresponding point in the finer level mesh representation in accordance with the least-squares optimization methodology if the magnitude of the indicator value is above a selected threshold value; and
  in which the coarse level mesh generator module is configured to determine, for at least one of said points in a quadrilateral mesh representation, which is not on a boundary, crease line or the like, for which the magnitude of the indicator value is below the selected threshold value, a position $c^j(k)$ in the coarse level mesh representation in accordance with $$c^j(k) = c^{j+1}(k) + \lambda_1 L_e(k,j+1) + \lambda_2 L_f(k,j+1)$$

where $c^{j+1}(k)$ represents the position of the corresponding point in the finer level mesh representation, $L_e(k,j+1)$ and $L_f(k,j+1)$ represent Laplacian values generated by the Laplacian generator module for the point in the finer level mesh representation, and $\lambda_1$ and $\lambda_2$ represent parameters whose values are generated in accordance with $$\lambda_1 = \frac{1}{L_e(k, j+1)} \left[ b_{10}^{\infty} L_e(k, j+1) + \frac{1}{K} b_{11}^{\infty} \sum_{l \in N(k,j+1)} L_f(l, j+1) \right]$$

and $$\lambda_2 = \frac{1}{L_f(k, j+1)} \left[ b_{20}^{\infty} L_f(k, j+1) + \frac{1}{K} b_{21}^{\infty} \sum_{l \in N(k,j+1)} L_f(l, j+1) \right]$$

where, if the at least one of said points is regular, that is, if its valence "K" is "four,"

$$b_{10}^{cc} = -\frac{9946871}{4862025}$$

$$b_{11}^{cc} = -\frac{1024}{405}$$

$$b_{20}^{cc} = \frac{1644032}{972405}$$

-continued $$b_{21}^{cc} = -\frac{1338874}{972405}$$

and, if the at least one point is irregular, that is, its valence "K" is other than "four,"

$$b_{10}^{cc} = \frac{162307143936 - 92746939392K - 8924282387K^3}{4862025(12544 - 14336K + 4096K^2 + 901K^3)}$$

$$b_{11}^{cc} = \frac{1024(2793728 - 1596416K - 244001K^3)}{99225(12544 - 14336K + 4096K^2 + 901K^3)}$$

$$b_{20}^{cc} = \frac{512(-113305472 + 64745984K + 17391149K^3)}{4862025(12544 - 14336K + 4096K^2 + 901K^3)}$$

$$b_{21}^{cc} = \frac{4(8660934688 - 4949105536K - 1876158821K^3)}{4862025(12544 - 14336K + 4096K^2 + 901K^3)}.$$

* * * * *